United States Patent [19]
Soo

[11] Patent Number: 5,570,306
[45] Date of Patent: Oct. 29, 1996

[54] METHOD AND APPARATUS FOR RECOGNIZING A BIT PATTERN IN A STRING OF BITS, ALTERING THE STRING OF BITS, AND REMOVING THE ALTERATION FROM THE STRING OF BITS

[75] Inventor: Paul J. Soo, Sacramento, Calif.

[73] Assignee: Intel Corporation, Santa Clara, Calif.

[21] Appl. No.: 333,148

[22] Filed: Nov. 1, 1994

[51] Int. Cl.$^6$ ............................... G06F 7/00; G06F 15/00
[52] U.S. Cl. ............................... 364/715.11; 364/715.09; 375/368
[58] Field of Search ........................ 364/715.09, 715.1, 364/715.11, 715.04; 375/368

[56] References Cited

U.S. PATENT DOCUMENTS

| | | | |
|---|---|---|---|
| 4,554,541 | 11/1985 | Bielkevicius et al. | 364/715.11 |
| 4,787,095 | 11/1988 | Forth et al. | 375/368 |
| 4,829,462 | 5/1989 | Freeman et al. | 364/715.11 |
| 4,847,877 | 7/1989 | Besseyre | 375/368 |
| 5,282,194 | 1/1994 | Harley, Jr. et al. | 364/715.11 |
| 5,297,185 | 3/1994 | Best et al. | 375/368 |
| 5,383,142 | 1/1995 | Chung | 364/715.11 |

OTHER PUBLICATIONS

Stallings, William, Titled *Networking Standards: A Guide to OSI, ISDN, LAN, and MAN Standards*, Addison–Wesley Publishing Company, 1993, pp. 37–39, 57–67.

Black, Uyless, Titled *the V Series Recommendations: Protocols for Data Communications over the Telephone Network*, McGraw–Hill, Inc., 1991, pp. 107–117, 143–153, 157–173.

Stone, Harold S., Titled *Microcomputer Interfacing*, Addison–Wesley Publishing Company, 1983, pp. 178–184, 197–201.

*Primary Examiner*—Roy N. Envall, Jr.
*Assistant Examiner*—Emmanuel L. Moise
*Attorney, Agent, or Firm*—Blakely, Sokoloff, Taylor & Zafman

[57] ABSTRACT

A method and apparatus for recognizing a search pattern in an input string of bits is provided. According to one aspect of the invention, a portion of the string of bits is selected as a currently selected portion. Based upon the search pattern and the bits of the string of bits immediately preceding the currently selected portion, a first set of occurrence patterns is determined. The first set of occurrence patterns is determined such that if any of the occurrence patterns in the first set of occurrence patterns are contained in the currently selected portion of the string of bits, the string of bits contains the search pattern. A determination is then made whether the currently selected portion contains any of the occurrence patterns in the first set of occurrence patterns. Thus, based on whether the currently selected portion contains any of the occurrence patterns in the first set of occurrence patterns, it is determined whether the string of bits contains the search pattern.

49 Claims, 12 Drawing Sheets

METHOD AND APPARATUS FOR RECOGNIZING A BIT PATTERN IN A STRING OF BITS, ALTERING THE STRING OF BITS, AND REMOVING THE ALTERATION FROM THE STRING OF BITS

BACKGROUND OF THE INVENTION

1. Field of the Invention

The present invention relates to the field of electronic devices. More specifically, the present invention relates to the area of recognizing a bit pattern in a string of bits, altering the string of bits, and removing the alteration from the string of bits.

2. Background Information

Many electronic devices transmit and/or receive bit streams. For example, two computers may communicate with each other by transmitting and receiving streams of bits. Such communication is often performed by connecting a modem to each computer and transmitting the bit streams over a standard telephone line connecting the modems. Various standards have been adopted for providing this communication, including the International Organization for Standardization Open Systems Interconnection model (ISO/OSI model). The ISO/OSI model uses the HDLC (high-level data-link control) standard for its data-link layer. The HDLC standard breaks down the data to be transmitted into sections, each of which is transmitted in a frame. Each frame starts and ends with a unique, pre-defined pattern of bits that is referred to herein as the "flag" or "frame delimiter". In addition to its section of the data, each frame may also contain information concerning the frame. Upon receiving a frame delimiter, the receiving device knows the following bits up to the next frame delimiter contains a portion of the data. The standard frame contains 256 bytes of data. The use of frames is discussed in "Networking Standards a Guide to OSI, ISDN, LAN and MAN Standards" by William Stallings, Addison-Wesley Publishing Co., 1993. It is worthwhile to note that the notation used in this application identifies the right most bit in a string of bits as the least significant bit and that bit streams are processed from least significant bit to most significant bit.

Since the data to be transmitted may contain the bit pattern used for the frame delimiter, any occurrence of the frame delimiter must be removed from the data to prevent confusion by the receiving device. This is commonly accomplished by using a technique called bit stuffing and stripping. When using this technique, the transmitting device alters the data by stuffing (i.e., inserting) a bit into the data after each occurrence of a search pattern (i.e., a bit pattern which is a portion of the frame delimiter). By altering the data in this pre-defined manner, all occurrences of the frame delimiter may be removed. The receiving device, which is aware of the pre-defined manner in which the data was altered, removes the alterations from the data by stripping the bits stuffed by the transmitting device. Therefore, the receiving device also alters the data in a pre-defined manner to return the data to its original form. For example, if the frame delimiter is "01111110", a useful search pattern would be five consecutive ones. Using this search pattern, the transmitting device will stuff a zero in the data after every series of five consecutive ones. Thus, if the data contains "01111110", the transmitting device will stuff a zero into the data such that it becomes "010111110." Consequently, the receiving device examines the bit following each occurrence of the search pattern in the data. If this bit is a 0, as it is in this example, it is stripped returning the data to its original form. However, if this bit is a 1, a frame delimiter has been received. It is worthwhile to note that the search pattern is not identical to the frame delimiter because the data must be altered in a manner such that the receiving device can systematically remove the stuffed bits from the data.

One prior art method of bit stuffing and stripping is to perform a bit-by-bit inspection of the data to identify occurrences of the search pattern. This method requires a significant amount of processor time. As a result, prior art hardware circuitry has been developed to minimize the main processor's workload.

SUMMARY OF THE INVENTION

A method for recognizing a search pattern in an input string of bits is provided. According to one aspect of the invention, a portion of the string of bits is selected as a currently selected portion. Based upon the search pattern and the bits of the string of bits immediately preceding the currently selected portion, a first set of occurrence patterns is determined. A determination is then made whether the currently selected portion contains any of the occurrence patterns in the first set of occurrence patterns. Then, based on whether the currently selected portion contains any of the occurrence patterns in the first set of occurrence patterns, it is determined whether the string of bits contains the search pattern. According to another aspect of the present invention, the first set of occurrence patterns is determined such that if any of the occurrence patterns in the first set of occurrence patterns are contained in the currently selected portion of the string of bits, the string of bits contains the search pattern. According to another aspect of the present invention, the currently selected portion has become a processed portion of the string of bits, and the above steps may be repeated using the unprocessed remainder of the string of bits. According to another aspect of the present invention, the determination of whether the currently selected portion contains any of the first set of occurrence patterns is made by determining if the currently selected portion contains any of a first set of masked occurrence patterns. Wherein, the first set of masked occurrence patterns represents the first set of occurrence patterns with each masked occurrence pattern in the first set of masked occurrence patterns representing a number of the occurrence patterns in the first set of occurrence patterns. According to another aspect of the present invention, the first set of occurrence patterns is also determined using an exclusion pattern. The exclusion pattern is such that at least a first occurrence pattern which would indicate an occurrence of said search pattern in said string of bits if contained in said currently selected portion cannot be contained in said currently selected portion if said exclusion pattern is contained in said currently selected portion. Thus, if the exclusion pattern is found present in the currently selected portion, the occurrence patterns determined to be in the first set of the occurrence patterns is reduced.

According to another aspect of the present invention, a method for recognizing a search pattern in an input string of bits and for altering the string of bits is provided. A first number of consecutive bits from the string of bits is selected as the currently selected portion of the string of bits. This currently selected portion starts at a current location in the string of bits. Based upon the search pattern and the bits of said string of bits immediately preceding the currently selected portion, a first set of occurrence patterns is determined. It is then determined if the currently selected portion contains any of the occurrence patterns in the first set of occurrence patterns. Then, based on whether the currently selected portion contains any of the occurrence patterns in the first set of occurrence patterns, it is determined whether the string of bits contains the search pattern. If it is determined the string of bits contains any of the occurrence patterns in the first set of occurrence patterns, the string of bits is altered in a pre-defined manner. According to another aspect of the present invention, the first set of occurrence patterns is determined such that if any of the occurrence patterns in the first set of occurrence patterns are contained in the currently selected portion of the string of bits, the string of bits contains the search pattern. According to another aspect of the present invention, the determination of whether the currently selected portion contains any of the first set of occurrence patterns is made by determining if the currently selected portion contains any of a first set of masked occurrence patterns. Wherein, the first set of masked occurrence patterns represents the first set of occurrence patterns with each masked occurrence pattern in the first set of masked occurrence patterns representing a number of the occurrence patterns in the first set of occurrence patterns. According to another aspect of the present invention, the swing of bits is altered by removing a bit from the string of bits after each occurrence of the search pattern in the string of bits. According to another aspect of the present invention, the string of bits is altered by inserting a bit into the string of bits after each occurrence of the search pattern in the string of bits. According to another aspect of the present invention, the first set of occurrence patterns is also determined using an exclusion pattern. The exclusion pattern is such that at least a first occurrence pattern which would indicate an occurrence of said search pattern in said string of bits if contained in said currently selected portion cannot be contained in said currently selected portion if said exclusion pattern is contained in said currently selected portion. Thus, if the exclusion pattern is found present in the currently selected portion, the occurrence patterns determined to be in the first set of the occurrence patterns is reduced.

According to another aspect of the present invention, an apparatus for recognizing a search pattern in an input string of bits is provided. The apparatus generally includes a processor and a storage device. The storage device is coupled to the processor and stores a plurality of instructions. The plurality of instructions generally embody the logic for performing one or both of the previously provided methods.

BRIEF DESCRIPTION OF THE DRAWINGS

The invention may best be understood by referring to the following description and accompanying drawings which illustrate the invention. In the drawings.

DETAILED DESCRIPTION

A method and apparatus for recognizing a bit pattern in a string of bits, altering the string of bits, and removing the alteration from the string of bits are described. In the following description for purposes of explanation, specific numbers, materials and configurations are set forth in order to provide a thorough understanding of the present invention. However, it will be apparent to one skilled in the art that the present invention may be practiced without these specific details. In other instances, well-known systems are shown in diagrammatic or block diagram form in order not to obscure the present invention.

Figure 1:
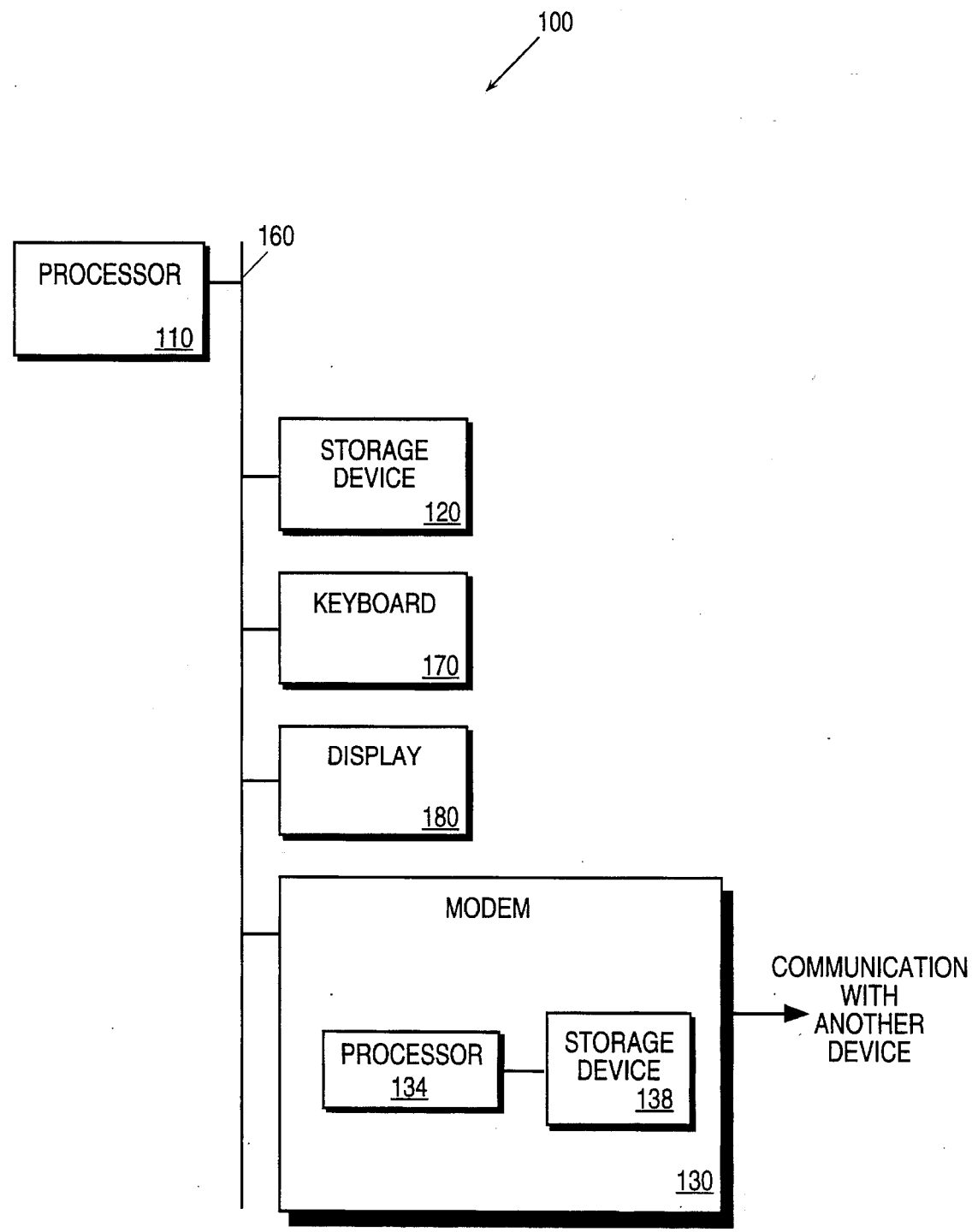
FIG. 1 illustrates a block diagram of an exemplary computer system.

Referring now to FIG. 1, a block diagram illustrating an exemplary computer system 100 incorporating the teachings of the present invention is shown. The exemplary computer system comprises a processor 110, a storage device 120, a modem 130, and a bus 160. Processor 110 is coupled to storage device 120 and modem 130 by bus 160. In addition, a number of user input/output devices, such as a keyboard 170 and a display 180, are also coupled to bus 160. Modem 130 comprises a processor 134 coupled to a storage device 138. Storage device 120 and storage device 138 each represent one or more mechanisms for storing data. For example, storage device 120 may include read only memory (ROM), random access memory (RAM), and/or a magnetic disk storage medium.

Highlight of the Present Invention

The present invention locates occurrences of a bit pattern in a string of bits by processing it portion-by-portion. For example, the present invention may be implemented to perform a byte-by-byte inspection of data to be transmitted to locate occurrences of the search pattern. The byte of the string of bits currently being processed is referred to herein as the current byte. To perform a byte-by-byte inspection, a number of sets of occurrence patterns (or information indicative of these sets of occurrence patterns) are used. The occurrence patterns in a set are all possible bit combinations which, if contained in the current byte, indicate the data contains an occurrence of the search pattern which concludes in the current byte. Thus, when a match is found, a transmitting device may stuff bits into the data or a receiving device may strip bits from the data. When selecting these occurrence patterns, it must be understood that the search pattern may overlap two consecutive bytes of the data. As a result, the bits preceding the current byte must be inspected to determine how much of the search pattern they contain, and the set of occurrence patterns must include occurrence patterns which would identify if the remainder of the search pattern is contained in the current byte.

When using the search pattern "11111" (previously described) and processing data byte-by-byte, the number of occurrence patterns is rather large. However, a number of "masked occurrence patterns", each of which corresponds to a number of occurrence patterns, may be used to represent these occurrence patterns. For example, if the byte preceding the current byte is "10xxxxxx" (where "x" indicates a don't care condition), all bit combinations beginning with 4 consecutive ones (i.e., "0000<u>1111</u>", "0001<u>1111</u>", "0010<u>1111</u>", "0011<u>1111</u>", etc.) would indicate an occurrence of the search pattern and can be represented by masked occurrence pattern "xxxx1111".

TABLE 1

| |
|---|
| xxxxxxx1 |
| xxxxxx11 |
| xxxxx111 |
| xxxx1111 |
| xxx11111 |
| xx111110 |
| x11111xx |
| 11111xxx |

Table 1 shows a possible collection of masked occurrence patterns which may be used by a transmitting/receiving device which alters the data by stuffing/stripping as previously described. The masked occurrence patterns in Table 1 may be divided up into sets as shown in Table 2, each of which is used when a different amount of the search pattern is contained in the bits of the data immediately preceding the current byte. Since the search pattern contains five consecutive ones, the sets of masked occurrence patterns are selected based upon the number of consecutive ones which precede the current byte. As an example, if the data is "<u>00000111 11100000</u>" with the underlined portion indicating the current byte, the current byte is preceded by three consecutive ones and set 3 from Table 2 will be selected. One of the masked occurrence patterns in set 3 contains two consecutive ones starting at the least significant bit (i.e., "xxxxxx11"). This masked occurrence pattern would identify the occurrence of the search pattern which overlaps into the current byte.

TABLE 2

| Number of Consecutive Ones Immediately Preceding the Current byte | Sets of Masked Occurrence Patterns |
|---|---|
| 0 | xxx11111 |
|  | xx111110 |
|  | x11111xx |
|  | 11111xxx |
| 1 | xxxx1111 |
|  | xx111110 |
|  | x11111xx |
|  | 11111xxx |
| 2 | xxxxx111 |
|  | xx111110 |
|  | x11111xx |
|  | 11111xxx |
| 3 | xxxxxx11 |
|  | xx111110 |
|  | x11111xx |
|  | 11111xxx |
| 4 | xxxxxxx1 |
|  | xx111110 |
|  | x11111xx |

TABLE 2-continued

| Number of Consecutive Ones Immediately Preceding the Current byte | Sets of Masked Occurrence Patterns |
|---|---|
|  | 11111xxx |

Although the present invention will be described in relation to a byte-by-byte inspection of the data, alternative embodiments may process any number of bits at a time.

One Embodiment of the Present Invention

One embodiment of the present invention utilizes as processor 134 a microcontroller from the Intel® 80C186 microcontroller family manufactured by Intel Corporation of Santa Clara, Calif. The Intel® 80C186 family is well known in the prior art, however it is thought worthwhile to provide an overview of the relevant aspects of the Intel® 80C186 family. The Intel® 80C186 family contains 16 bit registers. However, each of these 16 bit registers may be treated as two 8 bit registers. For example, 16 bit register AX may be divided into 8 bit registers AH and AL. Operations may be performed on the entire 16 bit register or on just one of 8 bit registers it contains. While the present invention is described with the reference to the Intel® 80C186, alternative embodiments could use, for example, a different processor or a multiprocessor configuration. In addition, these alternative embodiments need not contain a processor capable of the dual mode (i.e., 8 bit/16 bit) registers to implement the present invention.

In one embodiment, storage device 138 contains a plurality of instructions which embody the logic for the present invention and which are executed by processor 134. Rather than comparing the current byte to each of the possible occurrence patterns represented by the appropriate set of masked occurrence patterns in Table 2 (i.e., the set which would indicate an occurrence of the search pattern) to determine if an occurrence of the search pattern concludes in the current byte, these instructions compare the current byte to the masked occurrence patterns in the appropriate set of masked occurrence patterns in Table 2. In this manner, the number of comparisons is reduced to 4 masked occurrence patterns. In addition, these masked occurrence patterns are compared in the hierarchical order in which they are shown. This order is such that once a masked occurrence pattern is found in the current byte, the number of remaining masked occurrence patterns which would indicate another occurrence of the search pattern are reduced or eliminated. For example, if masked occurrence pattern "xxxxxx11" from set 3 is found in the current byte and the data is altered by inserting a 0 bit after the occurrence of the search pattern (i.e., "x xxxxx<u>0</u>11"), two of the remaining three masked occurrence patterns in set 3 (i.e., "xx111110" and "x11111xx") cannot be contained in the current byte. Therefore, once a masked occurrence pattern in a set of masked occurrence patterns is found to be contained in the current byte, only a corresponding "secondary set of masked occurrence patterns" containing only those masked occurrence patterns which could be contained in the current byte is compared to the current byte. The masked occurrence patterns and their corresponding secondary sets of masked occurrence patterns are shown in Table 3. For example, if the masked occurrence pattern

TABLE 3

| Masked Occurrence Pattern | Secondary Sets of Masked Occurrence Patterns |
| --- | --- |
| xxxxxxx1 | x11111xx |
|  | 11111xxx |
| xxxxxx11 | 11111xxx |
| xxxxx111 |  |
| xxxx1111 |  |
| xxx11111 |  |
| xx111110 |  |
| x11111xx |  |
| 11111xxx |  |

"xxxxxx11" from set 3 is found in the current byte, its corresponding secondary set of masked occurrence patterns (i.e., "11111xxx") must also be compared to the current byte. In contrast, if masked occurrence pattern "xxxxxx11" from set 3 is not contained in the current byte but masked occurrence pattern "xx111110" is, no further comparisons are required for the current byte because the secondary set of masked occurrence patterns corresponding to masked occurrence pattern "xx111110" from set 3 contains no masked occurrence patterns. While this embodiment uses instructions executing on a processor, alternative embodiments could use, for example, dedicated circuitry to implement portions or all of the present invention.

Figure 2:
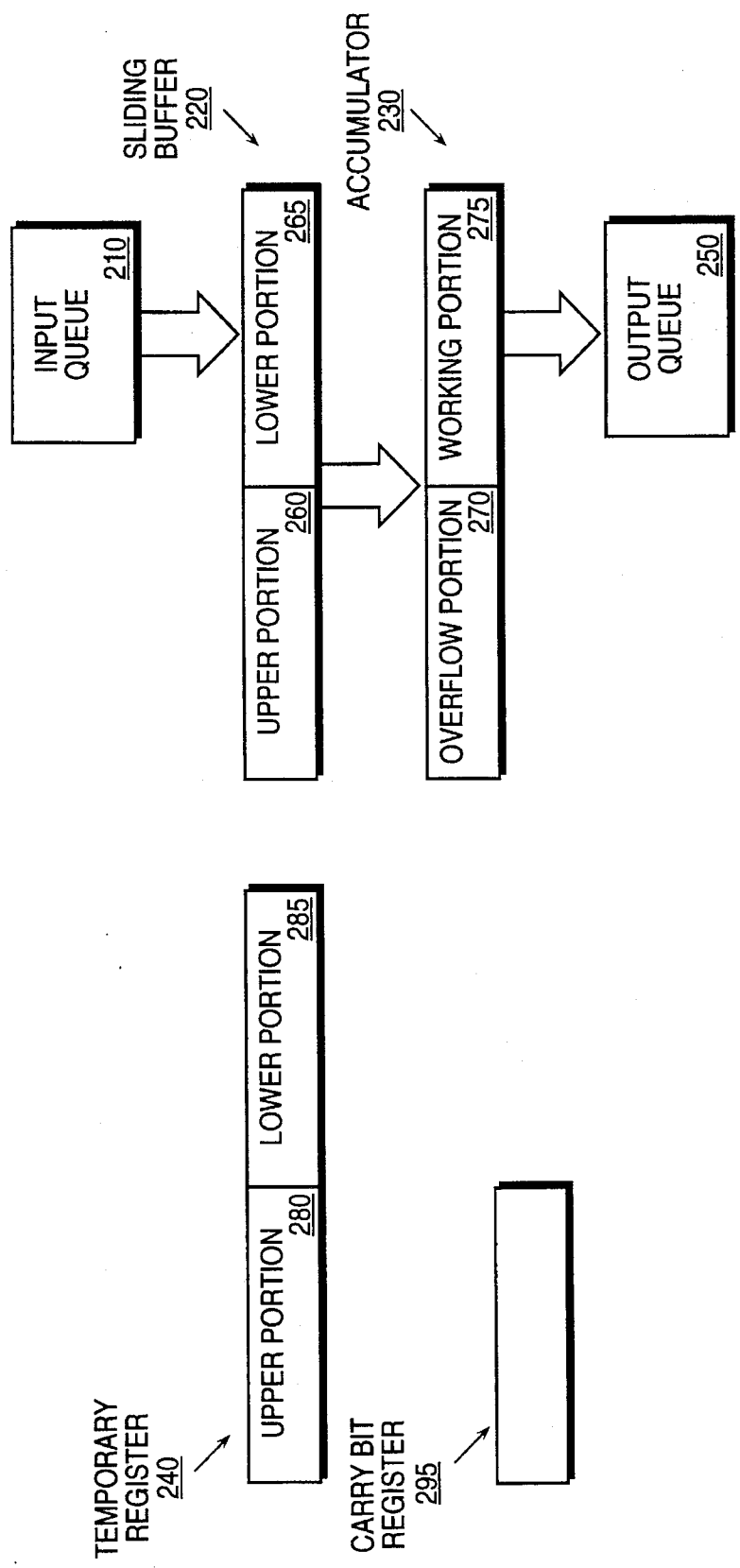
FIG. 2 illustrates a block diagram of the key elements according to one embodiment of the present invention.

Referring to FIG. 2, a block diagram of the key elements according to one embodiment of the present invention is shown. FIG. 2 shows an input queue 210, a sliding buffer 220, an accumulator 230, a temporary register 240, a carry bit register 295, and an output queue 250. The transmitting device receives a number of bytes or sets of signals representing the data for transmission. This data can be thought of as a string of bits which is inputted from somewhere in exemplary computer system 100. Input queue 210 is used for storing the data to be transmitted while output queue 250 is used for storing the processed or altered portions of this data. Input queue 210 and output queue 250 are preferably disposed in a memory in storage device 138. Carry bit register 295 represents a register in processor 134. Sliding buffer 220, accumulator 230, and temporary register 240 each represents a 16 bit register in processor 134. Sliding buffer 220 contains an upper portion 260 and a lower portion 265, while temporary register 240 contains an upper portion 280 and a lower portion 285. Accumulator 230 contains an overflow portion 270 and a working portion 275. Upper portion 260, overflow portion 270, upper portion 280 each represents the high byte of their respective registers, while lower portion 265, working portion 275, and lower portion 285 each represents the low byte of their respective registers. Sliding buffer 220 is used for moving bytes of the data from input queue 210 into accumulator 230. Accumulator 230, temporary register 240, and carry bit register 295 are used for processing the data. The bit of the data stored in the least significant bit of working portion 275 is referred to herein as the currently selected location in the data.

Transmitting

Figure 3A:
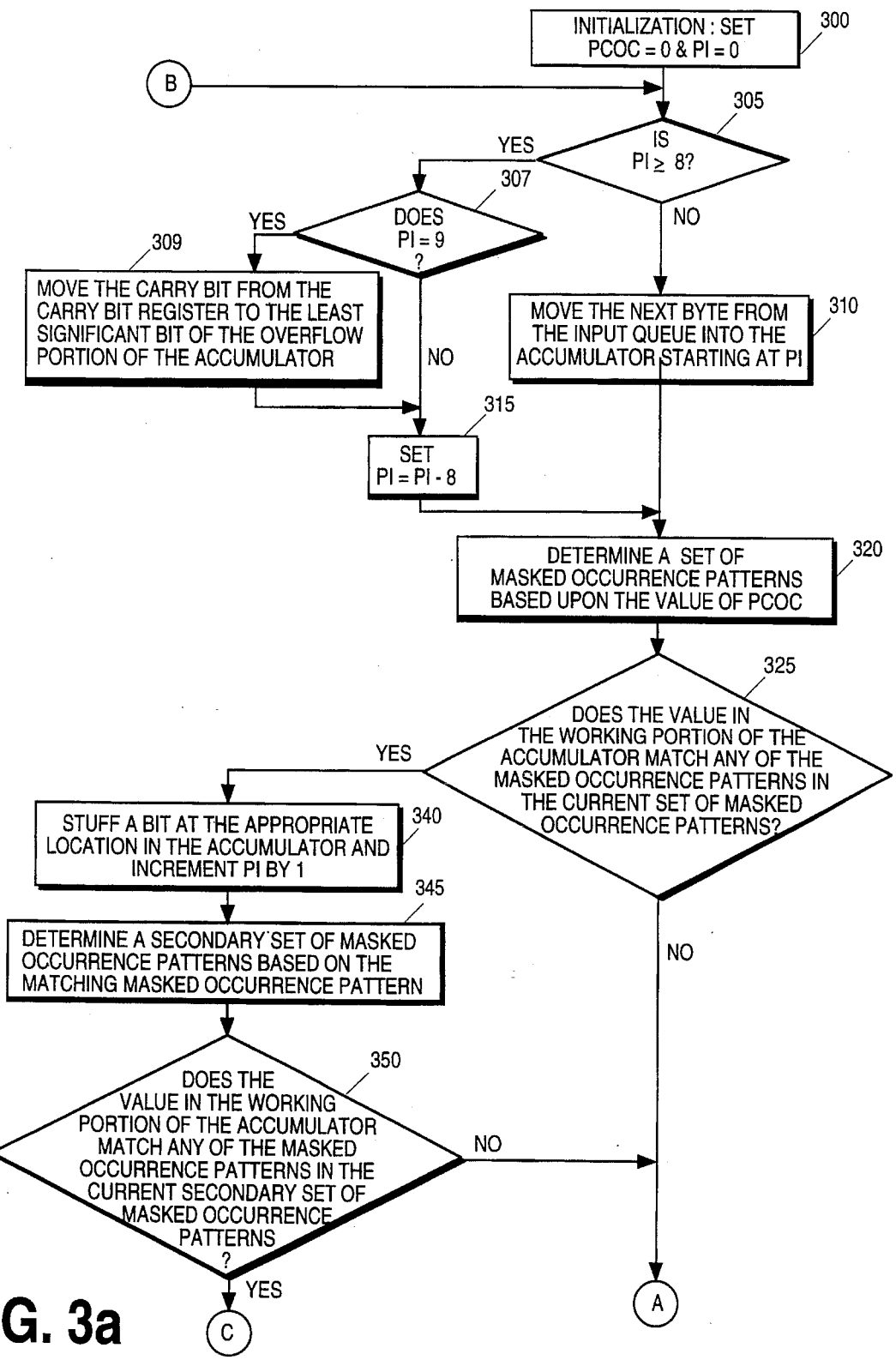
FIG. 3a shows a portion of a flow diagram which illustrates the overall operation of one embodiment of the present invention.
Figure 4:
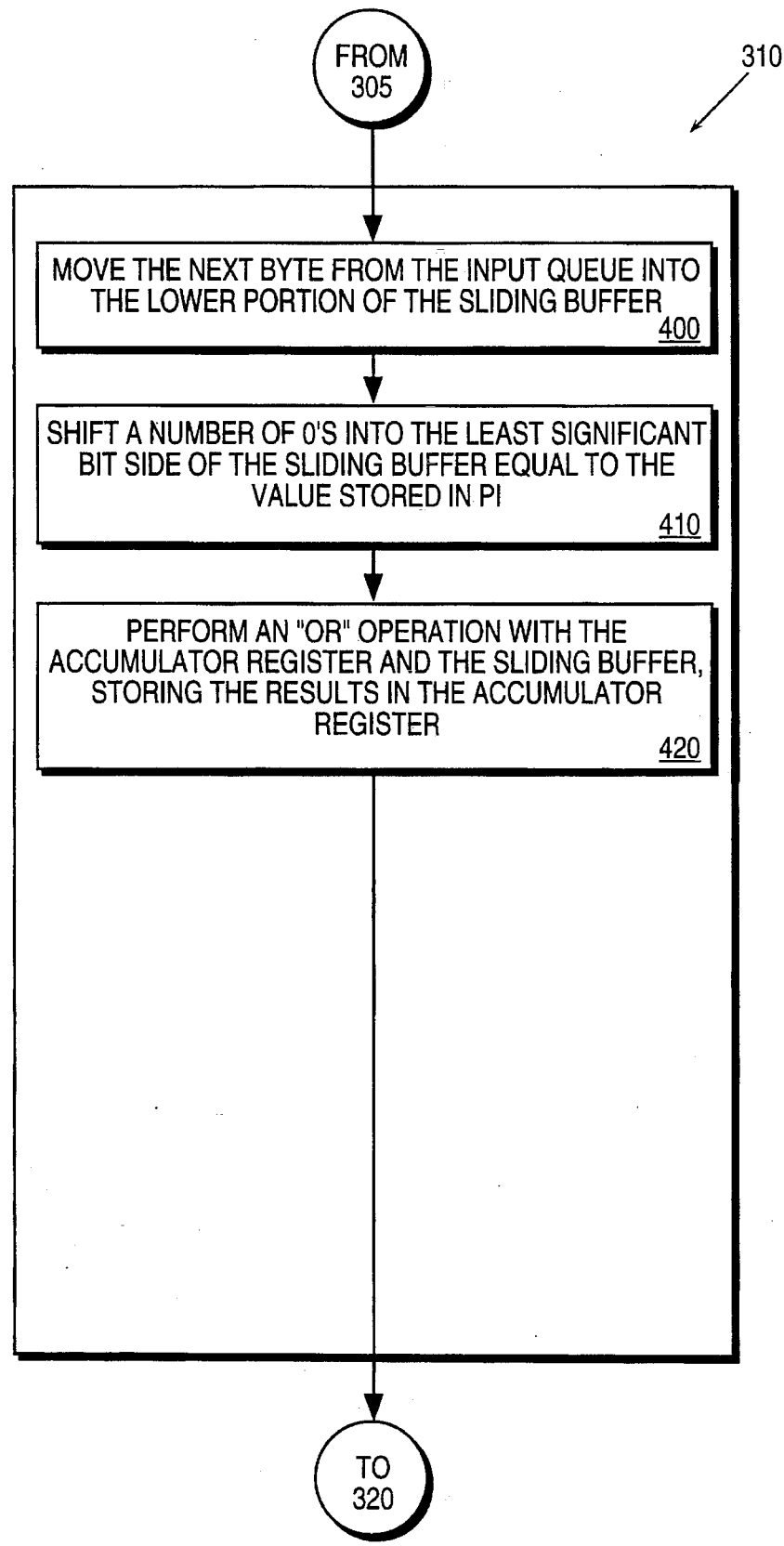
FIG. 4 illustrates a flow diagram of a portion of the flow diagram shown in FIG. 3a according to one embodiment of the present invention.
Figure 5:
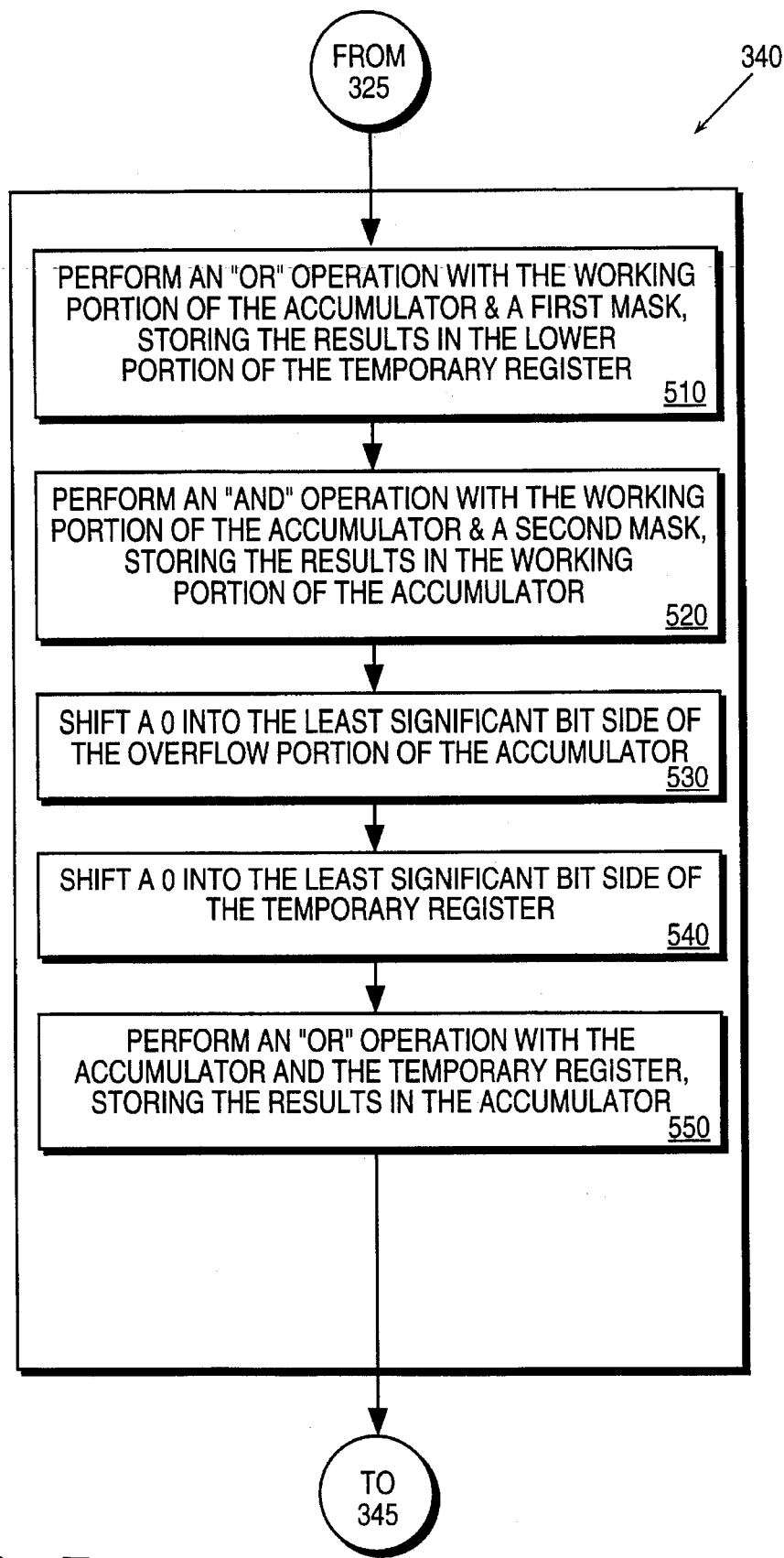
FIG. 5 illustrates a flow diagram of a portion of the flow diagram shown in FIG. 3a according to one embodiment of the present invention.
Figure 6:
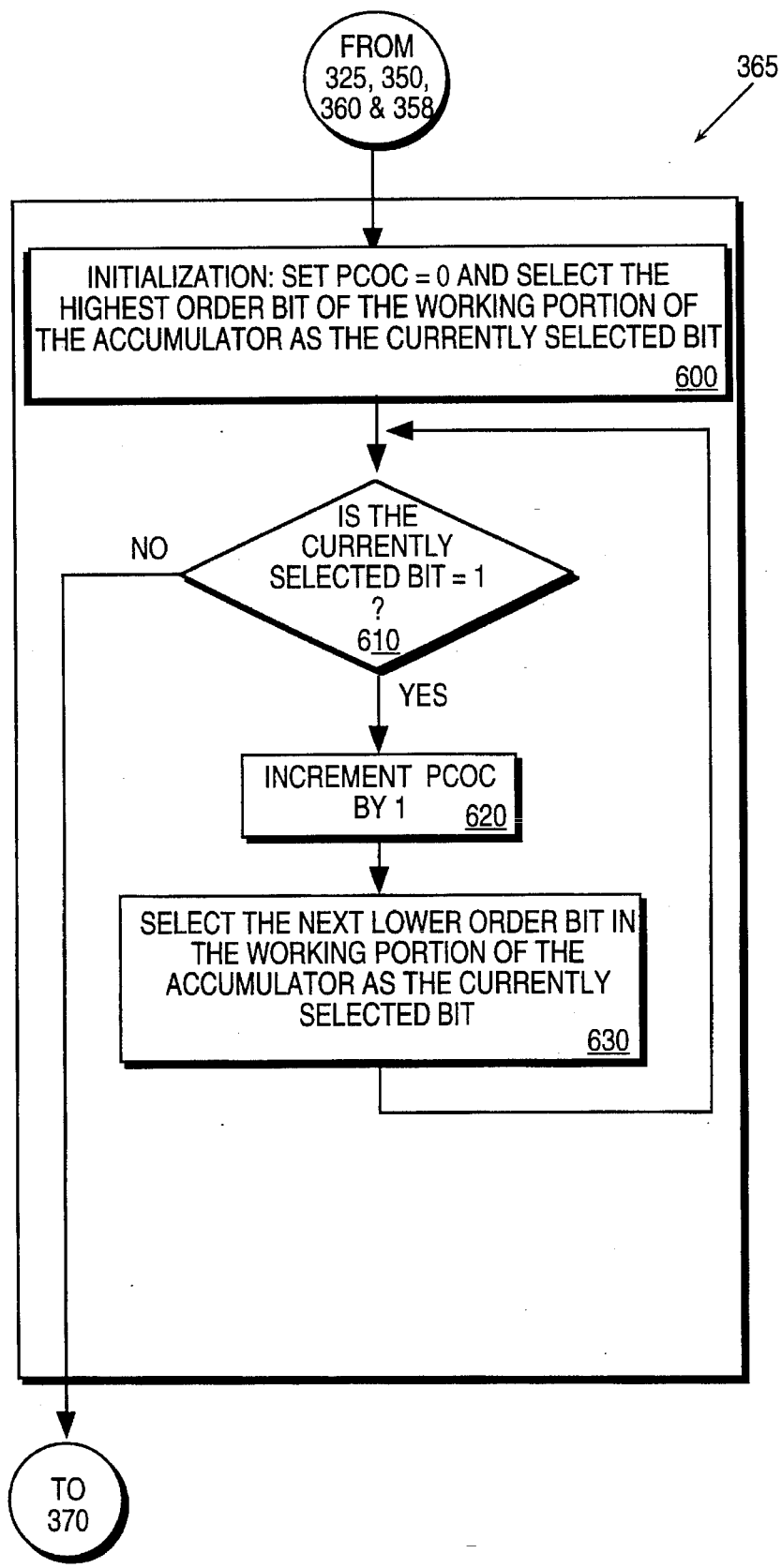
FIG. 6 illustrates a flow diagram of a portion of the flow diagram shown in FIG. 3b according to one embodiment of the present invention.

One embodiment of the present invention which is used for bit stuffing will now be described. FIGS. 3a and b illustrate a flow diagram of the overall operation of one embodiment of the present invention, while FIGS. 4 through 6 illustrate flow diagrams of portions of FIGS. 3a and b in further detail.

Referring now to FIGS. 3a and b, the overall operation of one embodiment of the present invention will now be described. At block 300, an initialization step is performed in which the preceding consecutive ones count (abbreviated herein as "PCOC") and the position index (abbreviated herein as "PI") are set to 0. The PCOC is used to store the number of consecutive ones preceding the current byte. The PI is used to store the starting location in the accumulator where the next byte from the input queue should be moved via sliding buffer 220. As will be described below, PI also indicates the number of bits which have been stuffed since PI was last set to 0.

As shown in block 305, the determination is made whether PI≧8. If PI≧8, flow passes to block 307. Otherwise, flow passes to block 310. To provide an example of this embodiment's operation, it will be assumed that PI was just set to 0 in block 300. Thus, flow passes to block 310.

At block 310, the next byte in the input queue is moved into the accumulator starting at PI and flow passes to block 320. One method of performing block 310 using sliding buffer 220 will be later described with reference to FIG. 4. In the present example, it is assumed the data to be transmitted is "11010101 11000011 11110111." Thus, the data contains the frame delimiter which is overlapping the first two bytes (i.e., "11000011 11110111"). Since PI=0, "11110111" would be moved into accumulator 230 starting at its' least significant bit location. Thus, overflow portion 270 would contain "00000000" and working portion 275 would contain "11110111". In this manner, a byte is extracted from the data stored in input queue 210.

As shown in block 320, a set of masked occurrence patterns is determined based on the value of PCOC and flow passes to block 325. In the present example, PCOC=0 and set 0 from Table 2 would be selected as the currently selected set of masked occurrence patterns. In one embodiment of the present invention, this routine is implemented in assembly language which branches to different portions of code based upon PCOC. These portions of code are written to use the masked occurrence patterns or information indicative of the masked occurrence patterns from one of the sets of masked occurrence patterns. However, alternative embodiments could use any number of methods to select the sets of masked occurrence patterns, including the use of an indexed table. It is worthwhile to note that if PCOC=5, set 0 from Table 2 is selected as the currently selected set.

At block 325, the determination is made whether the value in the working portion of the accumulator contains any of the masked occurrence patterns in the current set of masked occurrence patterns. If so, flow passes to block 340. Otherwise, flow passes to block 365. In the present example, working portion 275 contains a "11110111" and thus does not contain any of the masked occurrence patterns in set 0. As a result, flow passes to block 365.

According to one embodiment of the present invention, block 325 is implemented using 8 sections of code. Each section of code determining whether working portion 275 contains a corresponding one of the 8 masked occurrence patterns shown in Table 1. In the present example, to determine if working portion 275 contains the first masked occurrence pattern in set 0 (i.e., "xxx11111"), the section of code corresponding to that masked occurrence pattern is executed. This section of code stores in the lower portion of the temporary register the results of performing an "AND" operation using the working portion of the accumulator and the mask "00011111", and then determines if the lower portion of the temporary register contains "00011111" (i.e., 31 in base ten notation). In the present example, performing an "AND" operation with "11110111" and "00011111" would result in "00000111" (i.e., 8 in base ten notation) indicating working portion 275 does not contains the masked occurrence pattern "xxx11111". One of ordinary skill in the art would be able to determine how to implement the remaining comparisons for each masked occurrence pattern shown in Table 1. While the present invention is described using these sections of code, alternative embodiments could use various other techniques for performing block 325. One such alternative embodiment uses a direct look-up table and is described later in this application.

As shown in block 365, the value of PCOC is set for the next byte of the data and flow passes to block 370. One method of performing block 365 will be later described with reference to FIG. 6. In the present example, working portion 275 contains "11110111" and thus PCOC is set to 4 (i.e., the preceding ones for the next byte are "<u>1111</u>0111").

At block 370, the byte stored in the working portion of the accumulator is moved to the output queue and flow passes to block 375. In the present example, "11110111" is moved from working portion 275 to output queue 250. Thus, "1110111" is now a processed portion of the data. The balance of the data which remains unprocessed is referred to herein as the "unprocessed remainder" of the data.

As shown in block 375, the determination is made whether all of the current section of data has been processed. If so, flow passes to block 380. Otherwise, flow passes to block 390. In one embodiment, a separate loading routine is used which breaks the data to be transmitted into sections, each of which is to be transmitted in a frame. The loading routine loads each section into input queue 210 after the previous section has been processed and transmitted out of output queue 250. As a result, once all of the current section of data has been processed, it should be transmitted in a frame. While one embodiment is described which utilizes a separate loading routine, alternative embodiments could use any number of techniques to determine when to send a frame, including integrating a loading routine. The determination in block 375 is made by checking the status of input queue 210 and overflow portion 270. If neither contain any of the current section of data, all of it has been processed. In the present example, data remains in input queue 210 and flow passes to block 390.

As shown in block 390, the data in the overflow portion of the accumulator is moved into the working portion of the accumulator and flow passes back to block 305. In the present example, "00000000" is moved from overflow portion 270 to working portion 275.

Returning to block 305, the determination is again made whether PI≧8. If so, flow passes to block 307. Otherwise flow passes to block 310. In the present example, PI=0 and flow passes to block 310.

At block 310, the next byte in the input queue is moved into the accumulator starting at PI and flow passes to block 320. In the present example, PI=0 and "11000011"0 is moved into accumulator 230 starting at its' least significant bit location such that is contains "00000000 11000011".

As shown in block 320, a set of masked occurrence patterns is determined based on the value of PCOC and flow passes to block 325. In the present example, PCOC=4 and set 4 from Table 2 would be selected as the currently selected set.

At block 325, the determination is made whether the value in the working portion of the accumulator contains any of the masked occurrence patterns in the current set of masked occurrence patterns. If so, flow passes to block 340. Otherwise, flow passes to block 365. In the present example, working portion 275 is storing "11000011" and thus contains the masked occurrence pattern "xxxxxxx1" from set 4. As a result, flow passes to block 340.

As shown in block 340, a 0 bit is stuffed at the appropriate location in the accumulator and PI is incremented by 1. Flow then passes to block 345. One method of performing block 340 using temporary register 240 will be later described with reference to FIG. 5. The appropriate location to stuff the 0 bit is directly following an occurrence of the search pattern in the data (i.e., the bit following the occurrence of five consecutive ones). Thus, the appropriate location to stuff the bit depends upon the masked occurrence pattern which is found in the current byte. In the present example, the appropriate place to stuff the bit in the masked occurrence pattern "xxxxxxx1" is "xxxxxx<u>x</u>1". Thus, accumulator 230 would contain "00000001 10000101" with overflow portion 270 containing "00000001" and working portion 275 containing "10000101". In this manner, the bit which was pushed out of working portion 275 to make room for the insertion of the 0 bit (referred to herein as "overflow bits") is preserved in overflow portion 270. In addition, incrementing PI yields a value of 1.

At block 345, a secondary set of masked occurrence patterns is determined based on the matching masked occurrence pattern in block 325 and flow passes to block 350. In the present example, masked occurrence pattern "xxxxxxx1"0 from set 4 has a corresponding secondary set of masked occurrence patterns containing "11111xxx" and "x11111xx" as shown in Table 3. Thus, these masked occurrence patterns are selected as the currently selected set of masked occurrence patterns.

As shown in block 350, the determination is made whether the value in the working portion of the accumulator contains any of the masked occurrence patterns in the current secondary set of masked occurrence patterns. If so, flow passes block 355. Otherwise, flow passes to block 365. The determination in block 350 is performed in the same manner as block 325. In the present example, working portion 275 contains "10000101" and thus does not contain any of the masked occurrence patterns in the currently selected set of masked occurrence patterns. As a result, flow passes to block 365. If working portion 275 had contained one of the masked occurrence patterns in the current secondary set of masked occurrence patterns, another bit would be stuffed into the accumulator in block 360 or block 365 which are described later in this document.

As shown in block 365, the value of PCOC is set and flow passes to block 370. In the present example, working portion 275 contains "10000101" and thus PCOC is set to 1.

At block 370, the byte stored in the working portion of the accumulator is moved to the output queue and flow passes to block 375. In the present example, "10000101" is moved from working portion 275 to output queue 250. As a result, output queue 250 now contains "10000101 11110111". Thus, "10000101" is now also a processed portion of the data.

As shown in block 375, the determination is made whether all of the current section of data has been processed. If so, flow passes to block 380. Otherwise, flow passes to block 390. In the present example, all of the current section of data has not been processed because bits of it remain in input queue 210 and overflow portion 270. As a result, flow passes to block 390.

As shown in block 390, the byte in the overflow portion of the accumulator is moved into the working portion of the accumulator and flow passes back to block 305. In the present example, "00000001" is moved from overflow portion 270 to working portion 275. In this manner, the single overflow bit is moved to working portion 275 for processing.

Returning to block 305, the determination is again made whether PI≧8. If so, flow passes to block 307. Otherwise flow passes to block 310. In the present example, PI=1 and flow passes to block 310.

At block 310, the next byte in the input queue is moved into the accumulator starting at PI and flow passes to block 320. In the present example, PI=1 and "11010101" is moved into accumulator 230 starting one bit above its' least significant bit location such that it contains "00000001 10101011". As a result, overflow portion 270 containing "000000001" stores the most significant bit of the third byte moved from input queue 210 as an overflow bit. In this manner, the order of the bits in the data is preserved.

From block 310, flow passes through the blocks 320, 325, and 365 as previously described. At block 370, the byte stored in the working portion of the accumulator is moved into the output queue and flow passes to block 375. In the present example, "10101011" is moved from working portion 275 into output queue 250. As a result, output queue 250 now contains "10101011 10000101 11110111".

As shown in block 375, the determination is made whether all of the current section of data has been processed. If so, flow passes to block 380. Otherwise, flow passes to block 390. In the present example, a "1" remains in overflow portion 270. As a result, flow passes to block 390.

As shown in block 390, the byte in the overflow portion of the accumulator is moved into the working portion of the accumulator and flow passes back to block 305. In the present example, "00000001" is moved from overflow portion 270 to working portion 275. In this manner, the overflow bit is moved to working portion 275 for processing.

Returning to block 305, the determination is again made whether PI≧8. If so, flow passes to block 307. Otherwise flow passes to block 310. In the present example, PI=1 and flow passes to block 310.

At block 310, the next byte in the input queue is moved into the accumulator starting at PI and flow passes to block 320. In the present example, input queue 210 is empty and 0s are loaded into accumulator 230 starting one bit above its' least significant bit location such that it contains "00000000 000000001".

Flow passes through the blocks 320, 325, and 365 as previously described. At block 370, the byte stored in the working portion of the accumulator is moved into the output queue and flow passes to block 375. In the present example, "00000001" is moved from working portion 275 into output queue 250. As a result, output queue 250 now contains "00000001 10101011 10000101 11110111".

As shown in block 375, the determination is made whether all of the current section of data has been processed. If so, flow passes to block 380. Otherwise, flow passes to block 390. In the present example, all of the current section of data has been processed and flow passes to block 380.

At block 380, the current frame is transmitted and flow passes to block 385 where the flow diagram ends. Block 380 is performed by encapsulating the processed portions of the data with frame delimiters to create a frame, and then sending the frame out modem 130.

Figure 3B:
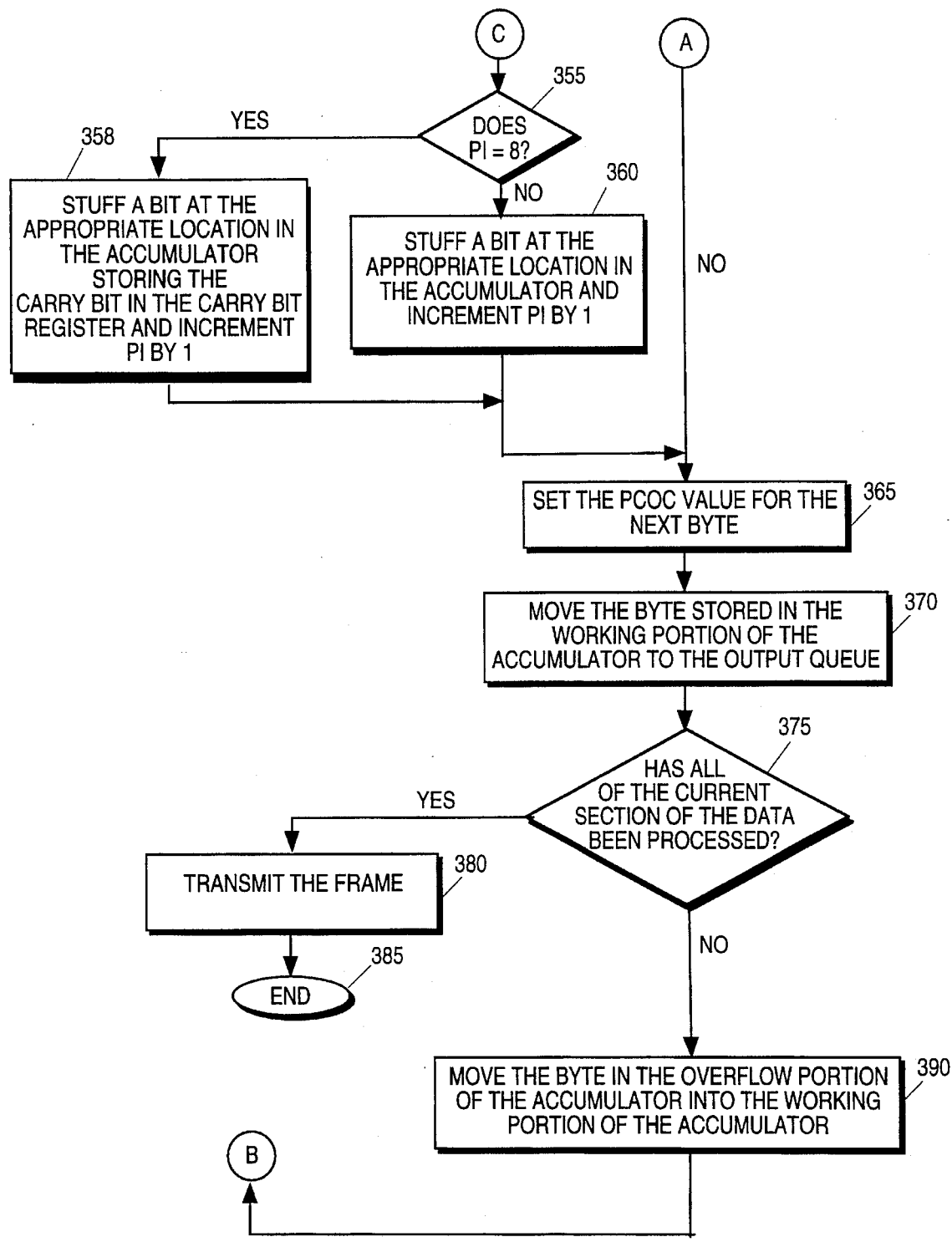
FIG. 3b show a portion of a flow diagram which illustrates the overall operation of one embodiment of the present invention.

It is thought worthwhile to describe blocks 301, 309, 315, 355, 358 and 360 of the flow diagram in FIGS. 3a and 3b which were not covered by the previous example. First, blocks 355, 360, and 358 will be described. At block 350, the determination is made whether the value in the working portion of the accumulator contains any of the masked occurrence patterns in the current secondary set of masked occurrence patterns as previously described. If so, flow passes to block 355. Otherwise, flow passes to block 365. For exemplary purposes, it is assumed the value in the working portion of the accumulator contains one of the masked occurrence patterns in the current secondary set of masked occurrence patterns and flow passes to block 355. At block 355, the determination is made whether PI=8. If PI is not equal to 8, flow passes to block 360. At block 360, another 0 bit is stuffed at the appropriate position in the accumulator and the PI is incremented by 1. Flow then passes to block 365. Block 360 is performed in the same manner as block 340. In contrast, if PI=8, the accumulator is full and flow passes from block 355 to 358. At block 358, another 0 bit is stuffed at the appropriate location in the accumulator storing the carry bit in the carry bit register and PI is incremented by 1. Flow then passes to block 365. Since it was determined in block 355 that the accumulator is full, block 358 is performed such that the most significant bit from the accumulator is stored in carry bit register 295 (this bit is now referred to as the "carry bit") to make room for another 0 bit to be stuffed and another 0 bit is then stuffed into accumulator 230 at the appropriate location. In this manner, the carry bit is preserved.

Another such portion of the flow diagram are blocks 307, 309, and 315. At block 305, the determination is made whether PI≧8. If PI≧8, flow passes to block 307. Otherwise, flow passes to block 310. When PI≧8, 8 or 9 bits have been stuffed into the dam. If 8 bits have been stuffed, a full byte will already be present in working portion 275 and the next byte in input queue 210 need not be loaded. Thus, flow passes to block 315. At block 315, PI is set to PI=PI-8. As a result, PI=0, overflow portion 270 is empty, and accumulator 230 has been reset. However, if 9 bits have been stuffed into the data (i.e., PI=9), a carry bit has been stored in the carry bit register as described in block 365 and flow passes from block 307 to block 309. As shown in block 309, the carry bit is moved from the carry bit register to the least significant bit location of the overflow portion of the accumulator. In this manner, the order of the data is preserved and flow passes to block 315. At block 315, PI is set to PI=PI-8. As a result, PI=1 and the carry bit is again an overflow bit.

Having described the overall operation of one embodiment of the present invention, portions of the flow diagram in FIGS. 3a and b will now be further described with reference to FIGS. 4 through 6.

Referring now to FIG. 4, a flow diagram of block 310 is shown according to one embodiment of the present invention. Flow passes from block 305 to block 400. For purposes of explanation, it is assumed that accumulator 230 contains "00000000 00000001", input queue 210 contains "11010101", and PI=1.

At block 400, the next byte from the input queue is moved into the lower portion of the sliding buffer and flow passes to block 410. In the present example, "11010101" is moved from input queue 210 to lower portion 265.

At block 410, a number of 0s equal to the value stored in PI is shifted into the least significant bit side of sliding buffer 220 and flow passes to block 420. In the present example, PI=1 and one 0 is shifted into the least significant bit side of sliding buffer 220. Thus, sliding buffer 220 now contains "00000001 10101010". This step is performed to move the data in sliding buffer 220 such that it is not in the corresponding locations of data stored in accumulator 230.

As shown in block 420, an "OR" operation is performed with the accumulator and the sliding buffer, and the results are stored in the accumulator. From block 420, flow passes to block 320. In the present example, an "OR" operation is performed with the contents of accumulator 230 and the contents of sliding buffer 220. As a result, accumulator 230 now contains "00000001 10101011". In this manner, the order of bits in the data is preserved.

Referring now to FIG. 5, a flow diagram of block 340 is shown according to one embodiment of the present invention. Flow passes from block 325 to block 510. For purposes of explanation, it is assumed that accumulator 230 contains "00000001 11000011", temporary register 240 contains "00000000 00000000", PCOC=4, and PI=1.

At block 510, an "OR" operation is performed using the working portion of the accumulator and a first mask, and the result is stored in the lower portion of the temporary register. From block 510, flow passes to block 520. The first mask is one byte and is calculated based upon the location in the current byte where the 0 bit is to be stuffed. As previously discussed, the 0 bit is to be stuffed at the location in the data directly following the search pattern, and thus is dependent on which of the masked occurrence patterns is found in the current byte of the data. Once the location is determined, the first mask is generated by setting it to 1s, except from the least significant bit up to the bit at the location to stuff. By performing an "OR" operation with this mask, the part of the byte stored in working portion 275 from the highest order bit to the stuff location is copied into lower portion 285 of temporary register 240. In the present example, the masked occurrence pattern "xxxxxxx1" from set 4 matches "11000011" stored in working portion 275. Thus, "xxxxx x1" marks the end of a string of five consecutive ones and the appropriate place to stuff the 0 bit. Consequently, the first mask is "11111110". Therefore, lower portion 285 now contains "11000010".

At block 520, an "AND" operation is performed using the working portion of the accumulator and a second mask, and the results are stored in the working portion of the accumulator. From block 520, flow passes to block 530. The second mask is also one byte long and calculated based upon the location in the current byte where the 0 bit is to be stuffed. The second mask is generated by setting it to 0s, except from the most significant bit to and including the bit at the location to stuff. By performing an "AND" operation with this mask, the part of the byte stored in working portion 275 below the stuff location is preserved. In the present example, the second mask is "00000001"0 and "00000001" is stored in working portion 275.

At block 530, a 0 bit is shifted into the least significant bit side of the overflow portion of the accumulator and flow passes to block 540. In the present example, a 0 is shifted into the least significant bit side of overflow portion 270. Thus, overflow portion 270 contains "00000010". This step is performed to move the overflow bits in overflow portion 270 over to make room for the bit to be stuffed.

At block 540, a 0 bit is shifted into the least significant bit side of the temporary register and flow passes to block 550. In the present example, a 0 is shifted into the least significant bit side of temporary register 240. Thus, temporary register 240 now contains "0000001 10000100". This step is performed to move the byte of data in temporary register 240 over to make room for the bit to be stuffed.

As shown in block 550, an "OR" operation is performed with the accumulator and the temporary register, the results of which are stored in the accumulator. From block 550, flow passes to block 345. In the present example, an "OR" operation is performed with the contents of accumulator 230 and the contents of temporary register 240. As a result, accumulator 230 now contains "00000011 10000101". In this manner, a 0 bit was inserted into the data and the overflow bits are preserved in overflow portion 270.

Referring now to FIG. 6, a flow diagram of block 365 is shown according to one embodiment of the present invention. Flow passes from blocks 325, 360, and 365 to block 600. For purposes of explanation, it is assumed that accumulator 230 contains "00000000 10000001".

At block 600, an initialization step is performed in which PCOC is set to 0 and the highest order bit of the working portion of the accumulator is selected as the currently selected bit. In the present example, "10000001" is selected as the currently selected bit.

As shown in block 610, the determination is made whether the currently selected bit is equal to 1. If it is, flow passes to block 620. Otherwise, flow passes to block 370. In the present example, the currently selected bit equals one.

At block 620, PCOC is incremented by 1 and flow passes to block 630. In the present example, PCOC now contains 1.

As shown in block 630, the next lower order bit in the working register is selected as the currently selected bit and flow passes to block 610. In the present example, "1 0000001" is selected as the currently selected bit.

At block 610, the determination is made whether the currently selected bit is equal to 1. If so, flow passes to block 620. Otherwise, flow passes to block 370. In the present example, the currently selected bit is not equal to 1 and flow passes to block 370. In this manner, PCOC is calculated.

Receiving

Figure 8A:
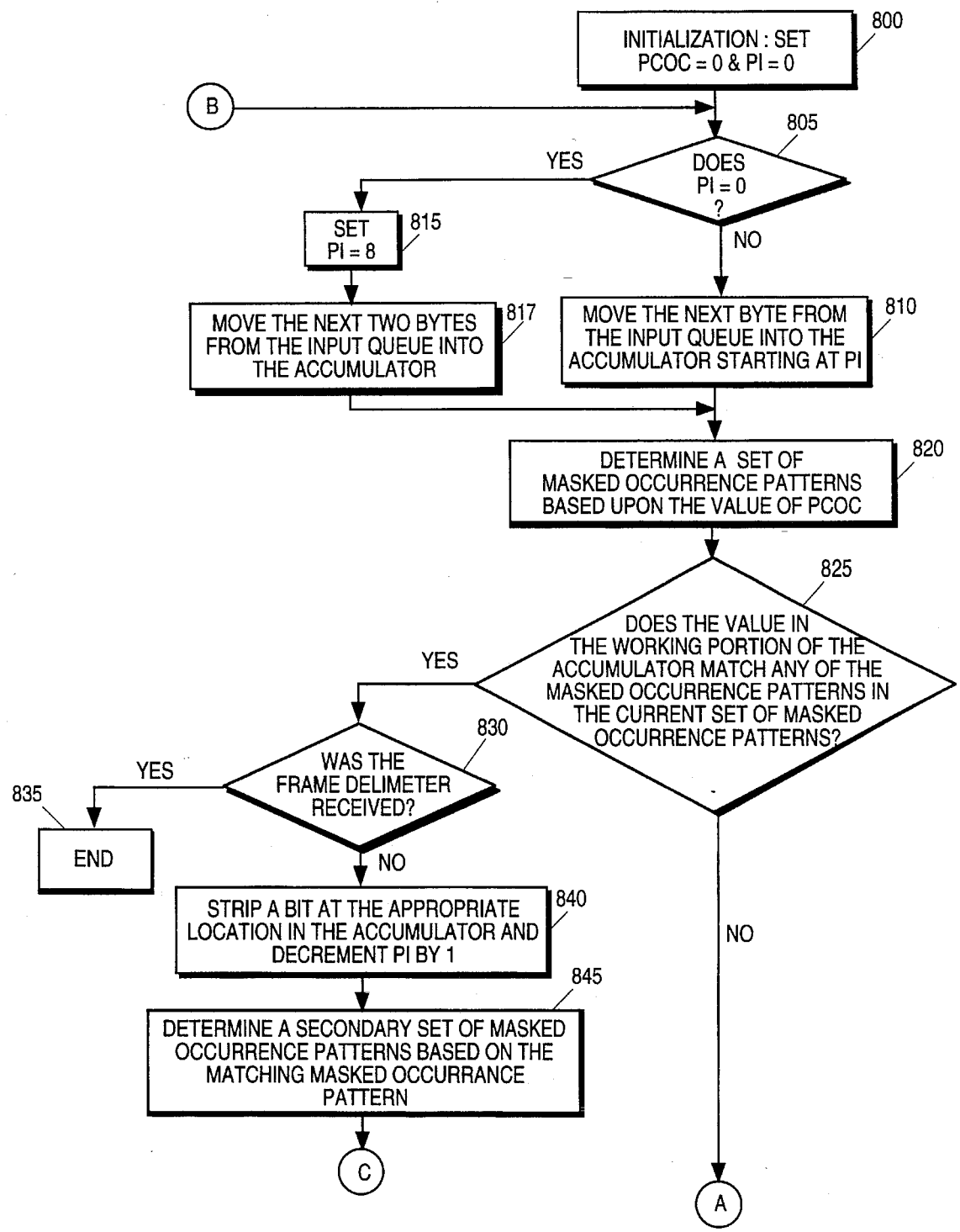
FIG. 8a shows a portion of a flow diagram which illustrates the overall operation of another embodiment of the present invention.
Figure 8B:
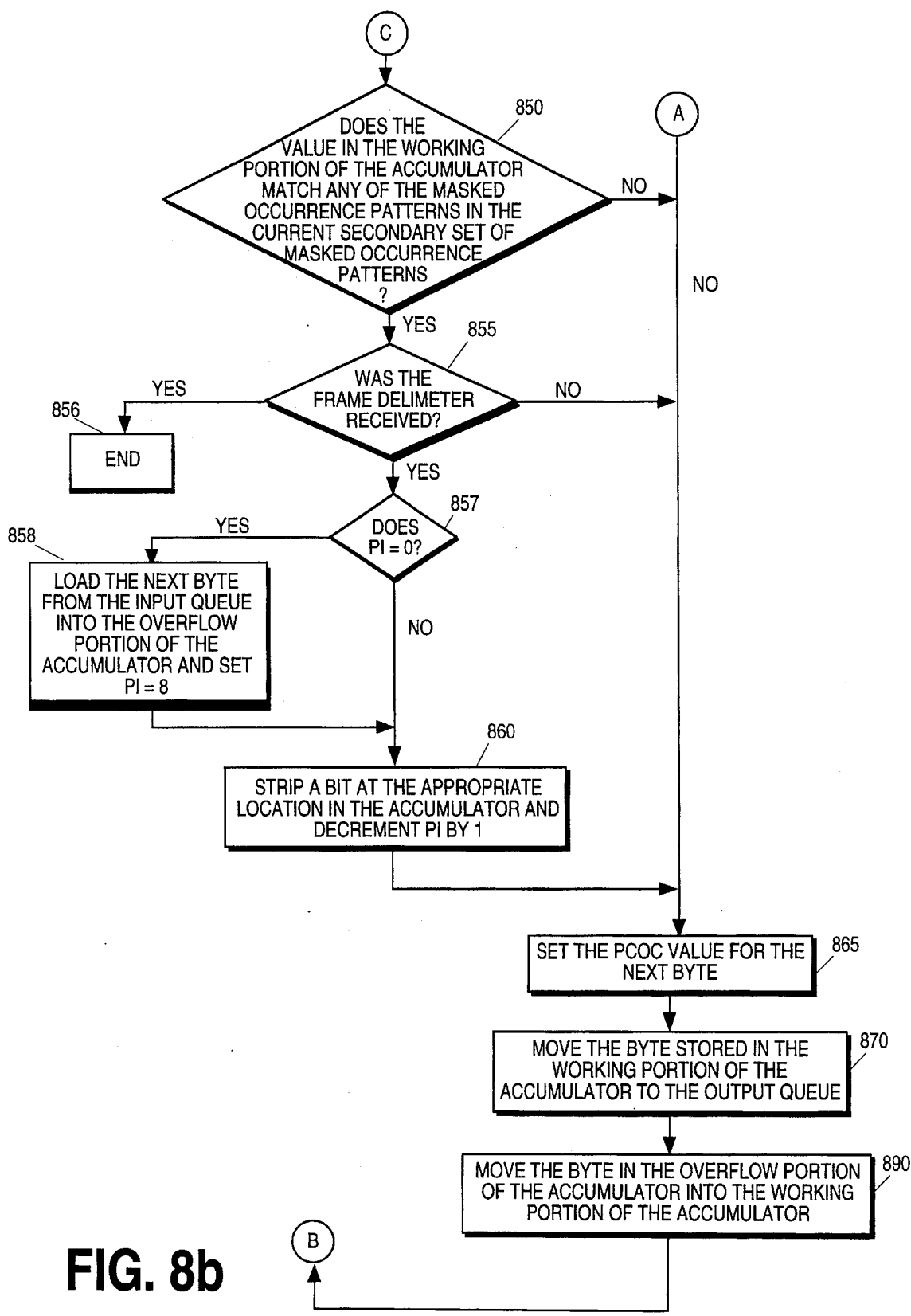
FIG. 8b show a portion of a flow diagram which illustrates the overall operation of another embodiment of the present invention.
Figure 9:
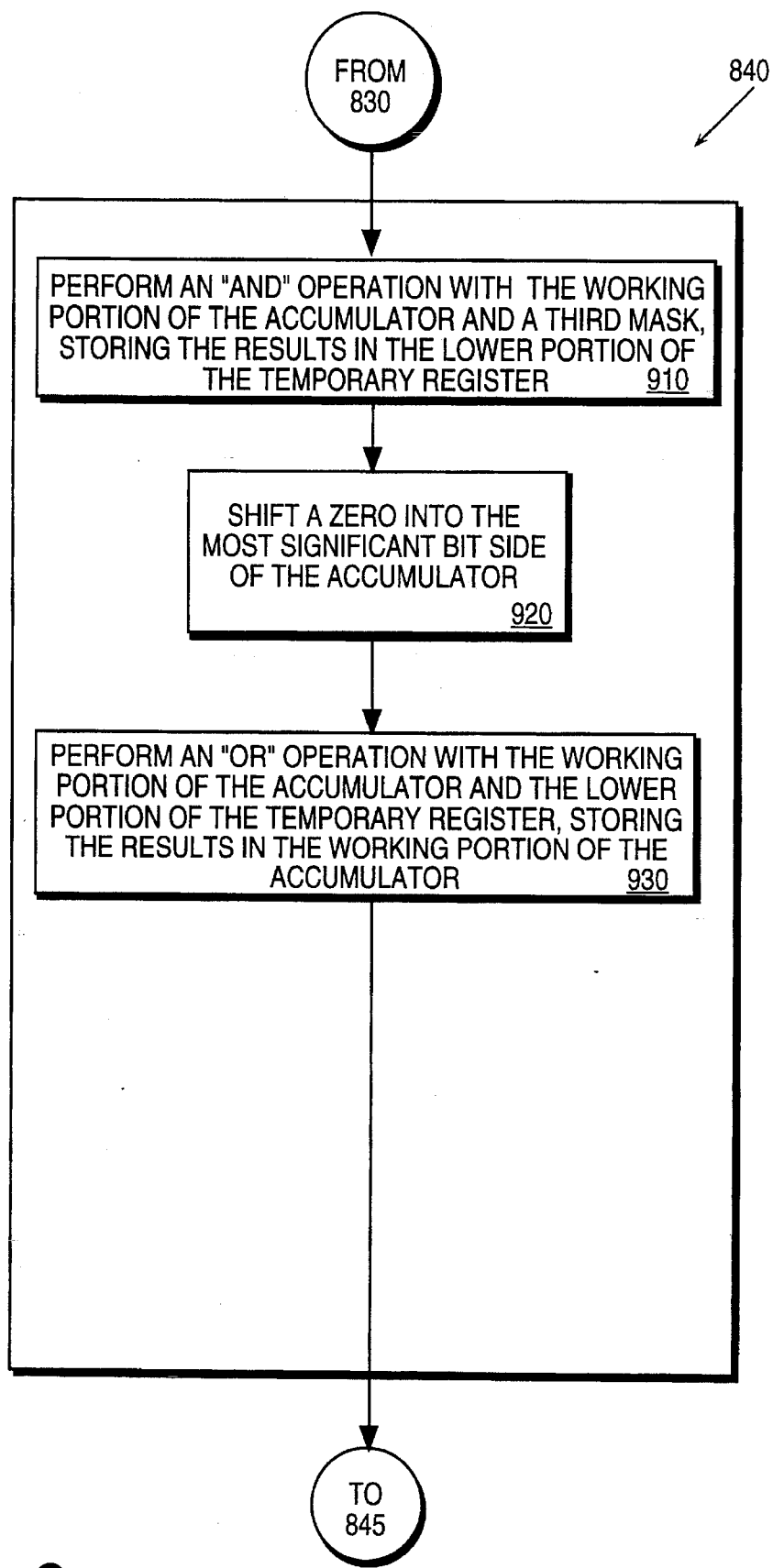
FIG. 9 illustrates a flow diagram of a portion of the flow diagram shown in FIG. 8a according to one embodiment of the present invention.

One embodiment of the present invention which is used for bit stripping will now be described. The receiving device operates in much the same manner as the transmitting device, with the exception that it undoes the stuffing performed by the transmitting device. As a result, the major difference lies in that rather than starting with a single byte in accumulator 230 and inserting bits into accumulator 230, the system starts with the two bytes in accumulator 230 and strips bits from the data. FIGS. 8a and b illustrate a flow diagram of the overall operation of one embodiment of the present invention, while FIG. 9 illustrates a flow diagram of a portion of FIG. 8a in further detail. To not further complicate this embodiment, it is assumed that the starting frame delimiter has been detected. Many techniques could be used for detecting the starting frame delimiter, including the present invention or a bit-by-bit comparison.

Referring now to FIGS. 8a and b, the overall operation of one embodiment of the present invention will now be described. At block 800, an initialization step is performed in which PCOC and PI are set to 0. PCOC and PI perform the same functions as previously described with one exception. Rather than PI indicating the number of bits which have been stuffed since PI was last set to 0, 8 minus PI indicates the number of bits which have been stripped since PI was last set to 8.

As shown in block 805, the determination is made whether PI=0. If PI=0, flow passes to block 815. Otherwise, flow passes to block 810. To provide an example of this embodiment's operation, it will be assumed that PI was just set to 0 in block 800. Thus, flow passes to block 815.

It is worthwhile to note, that when PI=0 either the system is being initialized or 8 bits have been stripped from the transmitted data. In both cases, accumulator 230 is empty and the next two bytes in input queue 210 need to be loaded. This loading is performed in blocks 815 and 817. However, if PI is not equal to 0, accumulator 230 is not empty and only 1 byte needs to be loaded from input queue 210 as is done in block 810.

At block 815, PI is set to 8 and flow passes to block 817.

As shown in block 817, the next two byte from the input queue are loaded into the accumulator and flow passes to block 820. For example, if "10101010 10111111" was the data to be transmitted, it contained the search pattern as shown by the underlining. Thus, the transmitting device would have stuffed a bit into the data such that it became "1 01010101 01011111" and transmitted it to the receiving device in a frame. As a result, the receiving device would receive "00000000 11111101 01010101 01011111 011111110", where the underlined portions are the frame delimiters. In this embodiment, upon detecting the starting frame delimiter, the receiving device would store the bits following the starting frame delimiter (i.e., "00000000 11111101 01010101 01011111") in input queue 210. Therefore, in the present example, "01010101 01011111" would be moved into accumulator 230 in block 817.

As shown in block 820, a set of masked occurrence patterns is determined based on the value of PCOC and flow passes to block 825. In the present example, PCOC=0 and set 0 from Table 1 would be selected as the currently selected set of masked occurrence patterns. Block 820 is performed in the same manner as described with reference to block 320.

At block 825, the determination is made whether the value in the working portion of the accumulator contains any of the masked occurrence patterns in the current set of masked occurrence patterns. If so, flow passes to block 830. Otherwise, flow passes to block 865. Block 825 is performed in the same manner as described with reference to block 325. In the present example, working portion 275 contains "01011111" and thus contains the masked occurrence pattern "xxx11111" from set 0. As a result, flow passes to block 830.

At block 830, the determination is made whether the frame delimiter was received. If so, flow passes to block 835. Otherwise, flow passes to block 840. This determination is made by examining the bit following the occurrence of the search pattern which was detected in block 825. If this bit is a 0, it was stuffed by the receiving device and the frame delimiter has not been received. However, if this bit is a 1, six consecutive ones have been detected and the frame delimiter has been received marking the end of the frame. In the present example, the bit to be examined (i.e., "01 011111") is a 0 and flow passes to block 840.

As shown in block 840, a 0 bit is stripped at the appropriate location in the accumulator and PI is decremented by 1. Flow then passes to block 845. One method of performing block 840 using temporary register 240 will be later described with reference to FIG. 9. The appropriate location to strip the 0 bit is directly following an occurrence of the search pattern in the data (i.e., the bit following the occurrence of five consecutive ones). Thus, the appropriate location to strip the bit depends upon the masked occurrence pattern which is found in the current byte. In the present example, the appropriate place to strip the bit in the masked occurrence pattern "xxx11111" is "xxx11111". Thus, accumulator 230 would contain "00101010 10111111" with overflow portion 270 containing "00101010" and working portion 275 containing "10111111". In this manner, the portion of the data in working portion 275 is returned to its original form. In addition, decrementing PI by 1 yields a value of 7.

At block 845, a secondary set of masked occurrence patterns is determined based on the matching masked occurrence pattern and flow passes to block 850. Block 845 is performed in the same manner as block 345. In the present example, the secondary set of masked occurrence patterns corresponding to masked occurrence pattern "xxx11111" from set 0 contains no masked occurrence patterns. Thus, no masked occurrence patterns are selected as the currently selected set of masked occurrence patterns.

As shown in block 850, the determination is made whether the value in the working portion of the accumulator contains any of the masked occurrence patterns in the current secondary set of masked occurrence patterns. If so, flow passes block 855. Otherwise, flow passes to block 865. In the present example, there are no masked occurrence patterns in the current secondary set of masked occurrence patterns. As a result, flow passes to block 865.

As shown in block 865, the value of PCOC is set and flow passes to block 870. Block 865 is performed in the same manner as block 365. In the present example, working portion 275 contains "10111111" and thus PCOC is set to 1.

At block 870, the byte stored in the working portion of the accumulator is moved to the output queue and flow passes to block 890. Block 870 is performed in the same manner as block 370. In the present example, "10111111" is moved from working portion 275 to output queue 250. As a result, output queue 250 contains "10111111". Thus, "10111111" is now a processed portion of the data.

As shown in block 890, the byte in the overflow portion of the accumulator is moved into the working portion of the accumulator and flow passes back to block 805. In the present example, "00101010" is moved from overflow portion 270 to working portion 275.

Returning to block 805, the determination is again made whether PI=0. If so, flow passes to block 815. Otherwise, flow passes to block 810. In the present example, PI=7 and flow passes to block 810.

At block 810, the next byte in the input queue is moved into the accumulator starting at PI and flow passes to block 820. Block 810 is performed in the same manner as block 310. In the present example, PI=7 and "11111101" is moved into accumulator 230 starting at its seventh most significant bit location such that it contains "01111110 10101010".

Flow passes through the blocks 820, 825, and 865 as previously described. At block 870, the byte stored in the working portion of the accumulator is moved into the output queue and flow passes to block 855. In the present example, "10101010" is moved from working portion 275 into output queue 250. As a result, output queue 250 now contains "10101010 10111111".

As shown in block 890, the byte in the overflow portion of the accumulator is moved into the working portion of the accumulator and flow passes back to block 805. In the present example, "01111110" is moved from overflow portion 270 to working portion 275.

Returning to block 805, the determination is again made whether PI=0. If so, flow passes to block 815. Otherwise, flow passes to block 810. In the present example, PI=7 and flow passes to block 810.

At block 810, the next byte in the input queue is moved into the accumulator starting at PI and flow passes to block 820. Block 810 is performed in the same manner as block 310. In the present example, PI=7 and "00000000" is moved into accumulator 230 starting at its seventh most significant bit location such that it contains "00000000 01111110".

As shown in block 820, a set of masked occurrence patterns is determined based on the value of PCOC and flow passes to block 825. In the present example, PCOC=1 and set 1 from Table 1 would be selected as the currently selected set of masked occurrence patterns. Block 820 is performed in the same manner as described with reference to block 320.

At block 825, the determination is made whether the value in the working portion of the accumulator contains any of the masked occurrence patterns in the current set of masked occurrence patterns. If so, flow passes to block 830. Otherwise, flow passes to block 865. Block 825 is performed in the same manner as described with reference to block 325. In the present example, working portion 275 contains "01111110" and thus contains the masked occurrence pattern "xx111110" from set 1. As a result, flow passes to block 830.

At block 830, the determination is made whether the frame delimiter was received. If so, flow passes to block 835. Otherwise, flow passes to block 840. This determination is made by examining the bit following the occurrence of the search pattern which was detected in block 825. In the present example, the bit to be examined (i.e., "0<u>1</u>111110") is a 1 and the ending frame delimiter has been received. As a result, flow passes to block 835 where the flow chart ends. At this point, a routine would be implemented which would detect the next starting frame delimiter.

Since blocks 855, 856, 857, 858, and 860 of the flow diagram were not covered by the previous example, it is thought worthwhile to describe them here. As shown in block 850, the determination is made whether the value in the working portion of the accumulator contains any of the masked occurrence patterns in the current secondary set of masked occurrence patterns. If so, flow passes block 855. Otherwise, flow passes to block 865. For explanatory purposes, it is assumed that working portion 275 contains one of the masked occurrence patterns in the current secondary set of masked occurrence patterns and that PI=0. As a result, flow passes to block 855.

At block 855 the determination is made whether the frame delimiter was received. If so, flow passes to block 856 where the routine ends in the same manner as block 835. Otherwise, passes to block 857. Block 855 is performed in the same manner as block 830. Assuming the frame delimiter has not been received, another 0 bit needs to be stripped from the data and flow passes to block 857.

At block 857, the determination is made whether PI=0. If so, flow passes to block 858. Otherwise, flow passes to block 860. PI will be equal to 0 when the overflow portion of the accumulator is empty and another byte needs to be loaded from the input queue. In the present example, PI=0 and flow passes to block 858.

At block 858, the next byte from the input queue is loaded into the overflow portion of the accumulator and PI is set to 8. Flow then passes to block 860.

At block 860, a 0 bit is stripped at the appropriate location in the accumulator and PI is decremented by 1. Flow then passes to block 865. Block 860 is performed in the same manner as block 840.

Having described the overall operation of one embodiment of the present invention, portions of the flow diagram in FIGS. 8a and b will now be further described with reference to FIG. 9.

Referring now to FIG. 9, a flow diagram of block 840 is shown according to one embodiment of the present invention. Flow passes from block 830 to block 910. For purposes of explanation, it is assumed that accumulator 230 contains "01010101 01011111", temporary register 240 contains "00000000 00000000", PCOC=0, and PI=0.

At block 910, an "AND" operation is performed using the working portion of the accumulator and a third mask, and the result is stored in the lower portion of the temporary register. From block 910, flow passes to block 920. The third mask is one byte and is calculated based upon the location in the current byte where the 0 bit is to be stripped. As previously discussed, the 0 bit is to be stripped at the location in the data directly following the search pattern, and thus is dependent on which of the masked occurrence patterns is found in the current byte of the data. Once the location is determined, the first mask is generated by setting it to 0s, except from the least significant bit up to the bit prior to the bit to be stripped. By performing an "AND" operation with this mask, the part of the byte stored in working portion 275 from the lowest order bit to the strip location is copied into lower portion 285 of temporary register 240. In the present example, the masked occurrence pattern "xxx11111" from set 0 matches "01011111" stored in working portion 275. Thus, "xx<u>x</u>111111" marks the end of a string of five consecutive ones and the appropriate place to stripe the 0 bit. Consequently, the first mask is "00011111". Therefore, lower portion 285 now contains "00011111".

At block 920, a 0 bit is shifted into the most significant bit side of the accumulator and flow passes to block 930. In the present example, a 0 is shifted into the most significant bit side of accumulator 230. Thus, accumulator 230 contains "00101010 10101111".

As shown in block 930, an "OR" operation is performed with the working portion of the accumulator and the lower portion of the temporary register, the results of which are stored in the working portion of the accumulator. From block 930, flow passes to block 845. In the present example, an "OR" operation is performed with the contents of working portion 275 and the contents of lower portion 285. As a result, accumulator 230 now contains "00101010 10111111". In this manner, a 0 bit was stripped from the data.

Another Embodiment of the Present Invention

In another embodiment, the current byte may be initially compared to an "exclusion pattern", which, if present, greatly reduces the number of masked occurrence patterns in each set which need to be compared to the current byte. For example, if the byte currently being processed contains "xxx0xxxx", it could not contain any of the other masked occurrence patterns in set 0. Table 4 shows a possible collection of sets of masked occurrence patterns which may be used if the current byte contains the exclusion pattern "xxx0xxxx". From Table 4, it is apparent that the processing required to compare the masked occurrence patterns in a set may be either avoided or reduced to a single masked occurrence pattern when the exclusion pattern is present. In addition, the exclusion pattern is such that it eliminates all masked occurrence patterns from all of the secondary sets of masked occurrence patterns.

TABLE 4

| Number of Consecutive Ones Preceding the Current byte | Sets of Masked occurrence patterns |
| --- | --- |
| 0 | |
| 1 | |
| 2 | xxxxx111 |
| 3 | xxxxxx11 |
| 4 | xxxxxxx1 |

Figure 7:
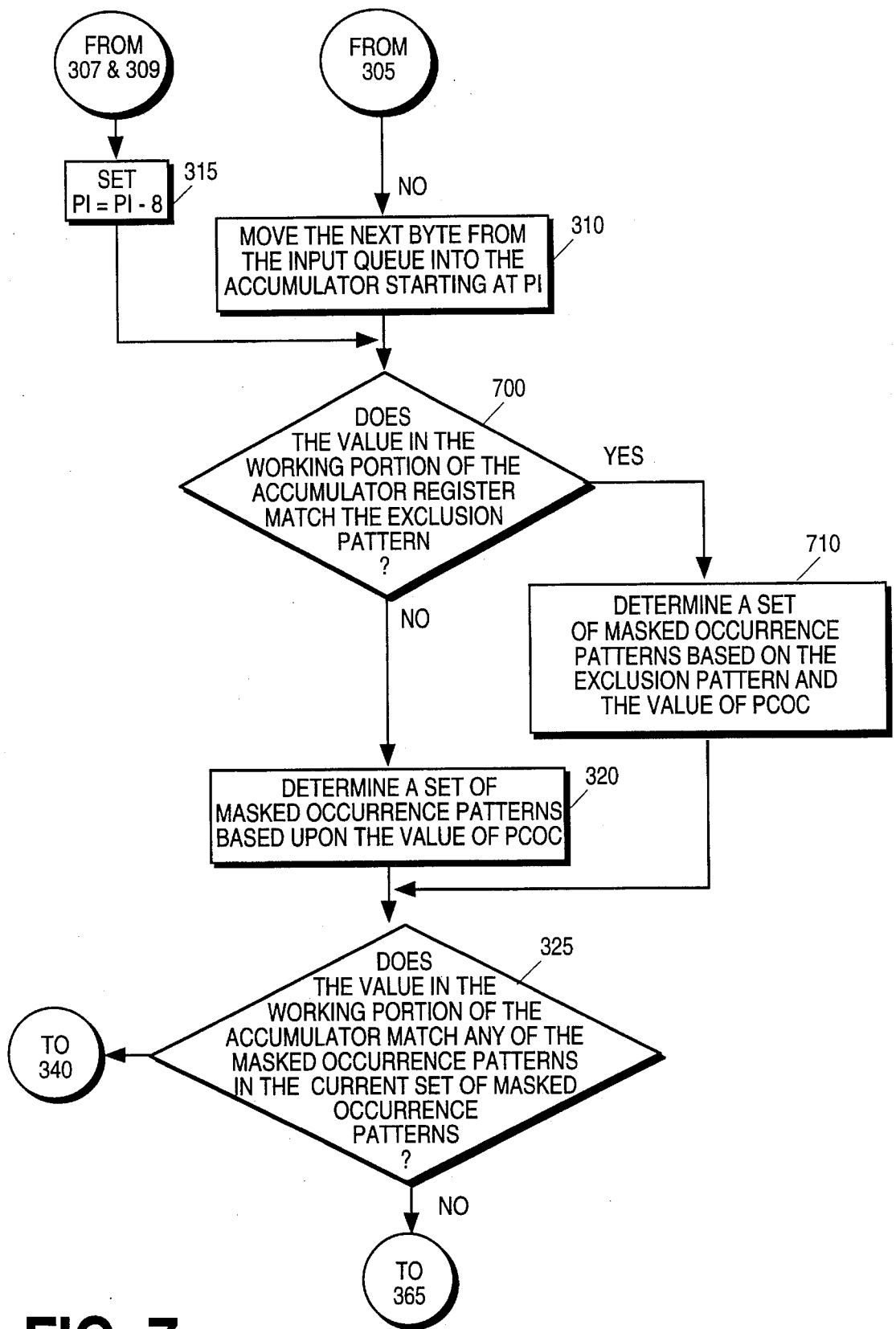
FIG. 7 illustrates a flow diagram of the inclusion of an exclusion pattern according to one embodiment of the present invention.

In one embodiment of the present invention, the flow diagram illustrated in FIGS. 3a and b is modified as shown in FIG. 7. FIG. 7 illustrates the insertion of blocks 700 and 710. Rather than flow passing from blocks 315 and 310 to block 320, flow passes to block 700. For explanatory purposes, it is assumed the exclusion pattern is "xxx0xxxx" (as previously described) and working portion 275 contains "11110111".

At block 700, the determination is made whether the value in the working portion of the accumulator contains the exclusion pattern. If it does, flow passes to block 710. Otherwise, flow passes to block 320. In the present example, the exclusion pattern is not in working portion 275 and flow passes to block 320.

As shown in block 320, a set of masked occurrence patterns is determined based on the value of PCOC and flow passes to block 325. In block 320, the sets from Table 2 would be used as previously described. Flow continues from block 325 as previously described with reference to FIGS. 3a and b.

In contrast, if working portion 275 contains the exclusion pattern, a different result occurs. For explanatory purposes, it is assumed working portion 275 contains "10000101" and PCOC=4. At block 700, the determination is made whether the value in the working portion of the accumulator contains the exclusion pattern. In the present example, the exclusion pattern is present in working portion 275 and flow passes to block 710.

At block 710, a set of masked occurrence patterns is determined based on the exclusion pattern and the value of PCOC. Flow then passes to block 325. In block 710, the sets from Table 4 would be used in the same manner as those in Table 2. In the present example, PCOC=4 and set 4 would be selected as the currently selected set of masked occurrence patterns. It should be noted that set 4 from Table 4 contains only masked occurrence pattern "xxxxxxx1". From block 325, flow continues as previously described with reference to FIGS. 3a and b, but the number of masked occurrence patterns in the current set of masked occurrence patterns has been reduced to one and there are no masked occurrence patterns in the secondary set of masked occurrence patterns.

It is worthwhile to note, that the flow diagram shown in FIGS. 8a and b may be modified in a similar manner to include the use of the exclusion pattern.

Another Embodiment Of the Present Invention

Another embodiment utilizes a direct look-up table and the occurrence patterns (rather than the masked occurrence patterns) to determine if the value in the working portion of the accumulator matches any of the occurrence patterns. The direct look-up table comprises 5 pages and is preferably stored in storage device 138. Each page represents one of the sets of masked occurrence patterns in Table 2. For example, page 0 represents set 0, which is used when PCOC=0. The direct look-up table is stored in storage device 138 such that the values of PCOC may be used to calculate the starting address of their corresponding page in the direct look-up table. In this manner, the value of PCOC may be used to select the page of the direct-look up table which represents the appropriate set of occurrence patterns.

Each of the possible bit combinations of 8 bits (i.e., "00000000", "00000001", "00000010", etc.), referred to herein as "comparison bytes", has a corresponding entry on each of the 5 pages in the direct look-up table. Thus, each page has 256 entries, one for each comparison byte. The pages are stored in storage device 138 such that based on the starting address of the page, the values of the comparison bytes may be used to access their corresponding entries in the page. In this manner, each entry in the direct look-up table may be accessed using PCOC and a comparison byte.

As previously explained, each page represents a set of occurrence patterns. Those entries on a page which correspond to comparison bytes that are in the set of occurrence patterns represented by the page contain the starting address of a corresponding "altering routine." For example, page 0 represents set 0, and set 0 contains masked occurrence pattern "xx111110". Masked occurrence pattern "xx111110" is found in the following comparison bytes: "00111110", "01111110", "10111110", and "11111110". As a result, these comparison bytes are occurrence patterns for set 0. Therefore, in a transmitting device, the address stored as the corresponding address to each of these comparison bytes in page 0 is the starting address of an altering routine which stuffs a bit at "xx111110". In contrast, those entries which correspond to comparison bytes which are not occurrence patterns for a given page contain the starting address of code which processes the next byte in the input queue.

In this manner, a set of occurrence patterns is determined by selecting the appropriate page of the direct look-up table using PCOC. In addition, because the comparison bytes are all possible combinations of 8 bits, the working portion of the accumulator will always contains one of these comparison bytes. Thus, whether the working portion of the accumulator contains an occurrence pattern is determined by accessing the entry of the selected page which corresponds to the comparison byte stored in the working portion of the accumulator. If that entry contains the address of an altering routine, the working portion contains an occurrence pattern. Otherwise, the working portion does not contain an occurrence pattern. Since the pages are stored as described above, an entry may be accessed by simply using the value of PCOC and the value stored in the working portion of the accumulator.

It is worthwhile to note, that in some cases two masked occurrence patterns in a set of masked occurrence patterns can be contained in the current byte, thus requiring a transmitting device to stuff two 0 bits and a receiving device to possibly strip two 0 bits. For example, assuming set 4 is the correct set to use and the data to be transmitted is "11111111", masked occurrence pattern "xxxxxxx1" is contained in the data and requires a 0 bit be inserted such that the data becomes "1 11111101". In addition, the altered data contains masked occurrence pattern "x11111xx" from set 4. Therefore, a second 0 bit is inserted and the data becomes "11 01111101". As a result, the entries corresponding to comparison byte which require two bits be inserted contains the staring address of altering routines which insert two bits. For example, the entry corresponding to "11111111" contains the starting address of an altering routine which inserts a 0 bit at both "xxxxxxx1" and "x11111xx" resulting in "11 01111101".

Figure 10:
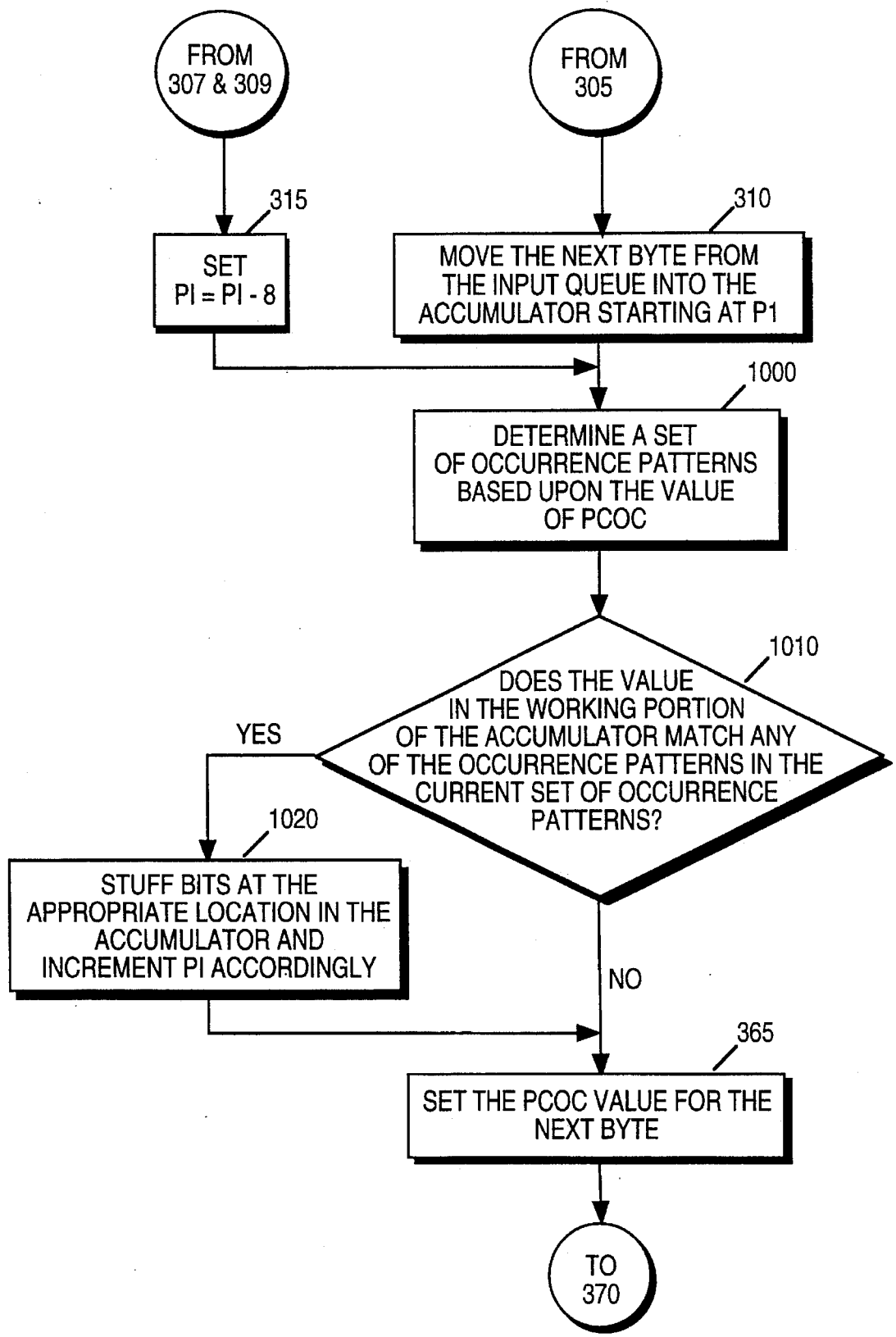
FIG. 10 illustrates another embodiment of the present invention.

In one embodiment of the present invention, the flow diagram illustrated in FIGS. 3a and b is modified as shown in FIG. 10. FIG. 10 illustrates the insertion of blocks 1000, 1010, and 1020 and the removal of blocks 320–360.

At block 1000, a set of occurrence patterns is determined based on the value of PCOC and flow passes to block 325. The set of occurrence patterns is determined by selecting the page of the direct look-up table which contains information indicative of the appropriate set of occurrences patterns from Table 2. This selection is based on the value of PCOC. For example, if PCOC=2, the page which contains information indicative of set 2 would be selected.

At block 1010, the determination is made whether the value in the working portion of the accumulator matches any of the occurrence patterns in the current set of occurrence patterns. If so, flow passes to block 1020. Otherwise, flow passes to block 365. The determination in block 1010 is made by using the value stored in the working portion of the accumulator and PCOC to calculate the address of the corresponding entry in the currently selected page of the direct look-up table. The address of this corresponding entry is then used to retrieve the address stored in this entry. The code located starting at the address stored in this entry is then executed. If the working portion contains one of the occurrence patterns, this address will be the address of the appropriate altering routine and flow passes to block 1020. However, if the working portion does not contain one of the occurrence patterns in the current set of occurrence patterns, this address will be an address such that flow passes to block 365. From block 365, flow continues as previously described with reference to FIGS. 3a and b.

As shown in block 1020, bits are stuffed at the appropriate locations in the accumulator and PI is incremented accordingly. From block 1020, flow passes to block 365. Block 1000 is performed by executing the appropriate altering routine. These altering routines perform the stuffing of bits in the manner previously described with reference to FIG. 5. In addition, the altering routine increment PI by the number of bits which were inserted into the data.

While one embodiment has been described with reference to a transmitting device, an alternative embodiment could be implemented as a receiving device. As previously described, a receiving device must check the bit following each occurrence of a search pattern in the data to determine if it is a 1 or a 0. If it is a 0, it should be stripped. However, if it is a 1, the frame delimiter has been received. However, another embodiment of the present invention, which may be used as a receiving device, uses sets of occurrence patterns which identify the occurrence of the search pattern "011111". Thus, it is no longer necessary to examine the bit following the occurrence of the five consecutive ones. In addition, those entries corresponding to comparison bytes which contain six consecutive one (i.e., an occurrence of the frame delimiter) contain the address of code which ends the processing of the current frame.

Alternative Embodiments

Although the present invention has been described in terms of several embodiments, many other alternative embodiments are possible. For example, rather than performing a byte-by-byte inspection, a larger portion (e.g., 16 bit portions) could be used. As a second example, rather than using the disclosed exclusion pattern and the masked occurrence patterns disclosed in Tables 1 & 2, alternative patterns could be used. As another example, the present invention could be partially or wholly implemented in a device other than a modem (e.g., the present invention could be implemented on processor 110). As a fourth example, alternative embodiments could use a different frame delimiter and/or search pattern. As a fifth example, the present invention could be used for a number of other purposes, including the calculation of the number of occurrences of a bit pattern in a string of bits. To implement this fifth example, the search pattern would be the bit pattern whose occurrences are being calculated, the string of bits need not be altered, and different occurrence patterns or masked occurrence patterns would be used. In a sixth example, the string of bits may be altered in a number of other ways, including inserting or removing more than one bit. As another example, a storage device could be integrated into processor 134 and a portion or all of the code required to implement the present invention could be stored in processor 134.

While the present invention has been described in terms of alternative embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. A computer implemented method for recognizing a search pattern in an input string of bits, said method comprising the steps of:

A) selecting a portion of said string of bits as a currently selected portion;

B) selecting a first set of masked occurrence patterns based on said search pattern and those bits of said string of bits immediately preceding said currently selected portion, said first set of masked occurrence patterns including one or more masked occurrence patterns, each representing a plurality of bit patterns that would be present in said currently selected portion if at least part of said search pattern is contained in said currently selected portion;

C) determining if said currently selected portion contains any of said first set of masked occurrence patterns; and D) determining if said string of bits contains said search pattern based on whether said currently selected portion contains any of said first set of masked occurrence patterns.

2. The method of claim 1, wherein said selecting in step B further comprises the steps of:

B1) determining how much of said search pattern is contained in those bits of said string of bits immediately preceding said currently selected portion; and B2) selecting said first set of masked occurrence patterns such that if any of said first set of masked occurrence patterns are contained in said currently selected portion, said string of bits contains said search pattern.

3. The method of claim 1, wherein said method further comprises the steps of:

repeating steps A through D on an unprocessed remainder of said string of bits, wherein said currently selected portion is now a processed portion of said string of bits.

4. The method of claim 1, wherein said determining in step C further comprises the step of comparing at least a first masked occurrence pattern of said first set of masked occurrence patterns to said currently selected portion.

5. The method of claim 4, wherein said method further includes the step of:

E) performing the following steps if it was determined in step C that said currently selected portion contains any of said first set of masked occurrence patterns:

E1) selecting a second set of masked occurrence patterns based on one of said first set of masked occurrence patterns determined in step C to be contained in said currently selected portion;

E2) determining if said currently selected portion contains any of said second set of masked occurrence patterns; and E3) determining if said string of bits contains said search pattern based on whether said currently selected portion contains any of said second set of masked occurrence patterns.

6. The method of claim 5, wherein said determining in step E3 further comprises the step of comparing at least a first masked occurrence pattern of said second set of masked occurrence patterns to said currently selected portion, wherein each masked occurrence pattern in said second set of masked occurrence patterns represents a plurality of occurrence patterns that would be present in said currently selected portion if said search pattern is contained within said currently selected portion.

7. The method of claim 1, wherein said selecting in step B further comprises the steps of:

B1) determining if said currently selected portion contains an exclusion pattern; and B2) selecting said first set of masked occurrence patterns based on said search pattern, those bits of said string of bits immediately preceding said currently selected portion, and whether said currently selected portion contains said exclusion pattern.

8. The method of claim 7, wherein said exclusion pattern is such that at least one masked occurrence pattern cannot be contained in said currently selected portion if said exclusion pattern is contained in said currently selected portion.

9. A method for recognizing a search pattern in an input string of bits, said method comprising the steps of:
- A) selecting a first number of consecutive bits from said string of bits as a currently selected portion;
- B) selecting a first set of bit patterns based on said search pattern and those bits of said string of bits immediately preceding said currently selected portion;
- C) operating on the bits of said currently selected portion in parallel to determine if said currently selected portion contains any of said first set of bit patterns; and
- D) determining if said string of bits contains said search pattern based on whether said currently selected portion contains any of said first set of bit patterns.

10. The method of claim 9, wherein said selecting in step B further comprises the steps of:
- B1) determining how much of said search pattern is contained in those bits of said string of bits immediately preceding said currently selected portion; and
- B2) selecting said first set of bit patterns such that if any of said first set of bit patterns are contained in said currently selected portion, said string of bits contains said search pattern.

11. The method of claim 9, wherein said operating in step C further comprises the steps of comparing at least a first pattern of said first set of bit patterns to said currently selected portion.

12. The method of claim 9, wherein said operating in step C further comprises the step of comparing at least a first masked pattern of a first set of masked bit patterns to said currently selected portion, wherein each masked bit pattern in said first set of masked bit patterns represents a plurality of bit patterns in said first set of bit patterns.

13. The method of claim 12, wherein said step A further includes the steps of:
- A1) selecting a location in said string of bits as a currently selected location; and
- A2) selecting said first number of consecutive bits from said string of bits starting at said currently selected location as said currently selected portion;

and wherein said method further comprises the step of:
- F) performing the following steps if said altering in step E was performed:
  - F1) selecting said first number of consecutive bits from said string of bits starting at said currently selected location as said currently selected portion;
  - F2) selecting a second set of bit patterns based on one of said first set of masked bit patterns determined in step C to be contained in said currently selected portion;
  - F3) determining if said currently selected portion contains any of said second set of bit patterns;
  - F4) determining if said string of bits contains said search pattern based on whether said currently selected portion contains any of said second set of bit patterns; and
  - F5) altering said string of bits in said pre-defined manner if it was determined said string of bits contains said search pattern.

14. The method of claim 13, wherein said determining in step F3 further comprises the step of comparing at least a first masked occurrence pattern of a second set of masked bit patterns to said currently selected portion, wherein each masked bit pattern in said first set of masked bit patterns represents a plurality of bit patterns in said second set of bit patterns.

15. The method of claim 9, wherein said selecting in step B further comprises the steps of:
- B1) determining if said currently selected portion contains an exclusion pattern; and
- B2) selecting said first set of bit patterns based on said search pattern, those bits of said string of bits immediately preceding said currently selected portion, and whether said currently selected portion contains said exclusion pattern.

16. The method of claim 15, wherein said exclusion pattern is such that at least a first bit pattern which would indicate an occurrence of said search pattern in said string of bits if contained in said currently selected portion cannot be contained in said currently selected portion if said exclusion pattern is contained in said currently selected portion.

17. The method of claim 9, further comprising the steps of:
- E) altering said string of bits in a pre-defined manner if it was determined said string bits contains said search pattern.

18. The method of claim 17, wherein said altering said string of bits in a pre-defined manner in step E further comprises the steps of:
- E1) determining if each occurrence of said search pattern determined to be contained in said string of bits in step C is part of an occurrence of a frame delimiter; and
- E2) removing a bit from said string of bits after each occurrence of said search pattern determined to be contained in said string of bits in step C which was determined not to be an occurrence of said frame delimiter.

19. The method of claim 17, wherein said altering said string of bits in a pre-defined manner in step E further comprises the step of inserting a bit into said string of bits after each occurrence of said search pattern if said string of bits is to be transmitted.

20. The method of claim 19, wherein said step A further comprises the steps of:
- A1) selecting a location in said string of bits as a currently selected location; and
- A2) selecting said first number of consecutive bits from said string of bits starting at said currently selected location as said currently selected portion;

and wherein said method further comprises the step of:
- F) repeating steps A through E on an unprocessed remainder of said string of bits, wherein at least said first number of consecutive bits starting at said currently selected location is now a processed portion of said string of bits.

21. The method of claim 20, wherein said method further includes the step of: transmitting in a frame said processed portions of said string of bits.

22. An apparatus for recognizing a search pattern in an input string of bits, said apparatus comprising:
- a processor for executing instructions during operation; and
- a storage device coupled to said processor storing a plurality of instructions, said plurality of instructions embodying logic for:
  - A) selecting a portion of said string of bits as a currently selected portion;
  - B) selecting a first set of masked occurrence patterns based on said search pattern and those bits of said string of bits immediately preceding said currently selected portion, said first set of masked occurrence patterns including one or more masked occurrence patterns, each representing a plurality of bit patterns that would be present in said currently selected portion if at least part of said search pattern is contained in said currently selected portion;

C) determining if said currently selected portion contains any of said first set of masked occurrence patterns; and D) determining if said string of bits contains said search pattern based on whether said currently selected portion contains any of said first set of masked occurrence patterns.

23. The apparatus of claim 22, wherein said plurality of instructions further embody logic for said selecting said first set of occurrence patterns by:

B1) determining how much of said search pattern is contained in those bits of said string of bits immediately preceding said currently selected portion; and B2) selecting said first set of masked occurrence patterns such that if any of said first set of masked occurrence patterns are contained in said currently selected portion, said string of bits contains said search pattern.

24. The apparatus of claim 22, wherein said plurality of instructions further embody logic for:

repeating steps A through D on an unprocessed remainder of said string of bits, wherein said currently selected portion is now a processed portion of said string of bits.

25. The apparatus of claim 22, wherein said plurality of instructions further embody logic for said determining if said currently selected portion contains any of said first set of occurrence patterns by comparing at least a first masked occurrence pattern of said first set of masked occurrence patterns to said currently selected portion.

26. The apparatus of claim 25, wherein said plurality of instructions further embody logic for:

E) performing the following steps if it was determined in step C that said currently selected portion contains any of said first set of masked occurrence patterns:

E1) selecting a second set of masked occurrence patterns based on one of said first set of masked occurrence patterns determined in step C to be contained in said currently selected portion;

E2) determining if said currently selected portion contains any of said second set of masked occurrence patterns; and E3) determining if said string of bits contains said search pattern based on whether said currently selected portion contains any of said second set of masked occurrence patterns.

27. The apparatus of claim 26, wherein said plurality of instructions further embody logic for said determining if said currently selected portion contains any of said second set of occurrence patterns by:

comparing at least a first masked occurrence pattern of said second set of masked occurrence patterns to said currently selected portion, wherein each masked occurrence pattern in said second set of masked occurrence patterns represents a plurality of occurrence patterns that would be present in said currently selected portion if said search pattern is contained within said currently selected portion.

28. The apparatus of claim 22, wherein said plurality of instructions further embody logic for said selecting said first set of occurrence patterns by:

B1) determining if said currently selected portion contains an exclusion pattern; and B2) selecting said first set of masked occurrence patterns based on said search pattern, those bits of said string of bits immediately preceding said currently selected portion, and whether said currently selected portion contains said exclusion pattern.

29. The apparatus of claim 28, wherein said exclusion pattern is such that at least one masked occurrence pattern cannot be contained in said currently selected portion if said exclusion pattern is contained in said currently selected portion.

30. An apparatus for recognizing a search pattern in an input string of bits, said apparatus comprising:

a processor for executing instructions during operation; and a storage device coupled to said processor storing a plurality of instructions, said plurality of instructions embodying logic for:

A) selecting a first number of consecutive bits from said string of bits as a currently selected portion;

B) selecting a first set of bit patterns based on said search pattern and those bits of said string of bits immediately preceding said currently selected portion;

C) operating on the bits of said currently selected portion in parallel to determine if said currently selected portion contains any of said first set of bit patterns; and D) determining if said string of bits contains said search pattern based on whether said currently selected portion contains any of said first set of bit patterns.

31. The apparatus of claim 30, wherein said plurality of instructions further embody logic for said selecting said first set of bit patterns by:

B1) determining how much of said search pattern is contained in those bits of said string of bits immediately preceding said currently selected portion; and B2) selecting said first set of bit patterns such that if any of said first set of bit patterns are contained in said currently selected portion, said string of bits contains said search pattern.

32. The apparatus of claim 30, wherein said plurality of instructions further embody logic for said operating on the bits of said currently selected portion in parallel to determine if said currently selected portion contains any of said first set of bit patterns by:

comparing at least a first pattern of said first set of bit patterns to said currently selected portion.

33. The apparatus of claim 30, wherein said plurality of instructions further embody logic for said operating on the bits of said currently selected portion in parallel to determine if said currently selected portion contains any of said first set of bit patterns by:

comparing at least a first masked pattern of a first set of masked bit patterns to said currently selected portion, wherein each masked bit pattern in said first set of masked bit patterns represents a plurality of bit patterns in said first set of bit patterns.

34. The apparatus of claim 33, wherein said plurality of instructions further embody logic for said selecting a portion of said string of bits as a currently selected portion by:

A1) selecting a location in said string of bits as a currently selected location; and A2) selecting said first number of consecutive bits from said string of bits starting at said currently selected location as said currently selected portion;

and wherein said plurality of instructions further embody logic for:

F) performing the following steps if said altering in step E was performed:

F1) selecting said first number of consecutive bits from said string of bits starting at said currently selected location as a currently selected portion;

F2) selecting a second set of bit patterns based on one of said first set of masked bit patterns determined in step C to be contained in said currently selected portion;

F3) determining if said currently selected portion contains any of said second set of bit patterns;

F4) determining if said string of bits contains said search pattern based on whether said currently selected portion contains any of said second set of bit patterns; and F5) altering said string of bits in a pre-defined manner if it was determined said string of bits contains said search pattern.

35. The apparatus of claim 34, wherein said plurality of instructions further embody logic for said altering said string of bits in a pre-defined manner by:

comparing at least a first masked occurrence pattern of a second set of masked bit patterns to said currently selected portion, wherein each masked bit pattern in said first set of masked bit patterns represents a plurality of bit patterns in said second set of bit patterns.

36. The apparatus of claim 30, wherein said plurality of instructions further embody logic for said selecting said first set of bit patterns by:

B1) determining if said currently selected portion contains an exclusion pattern; and B2) selecting said first set of bit patterns based on said search pattern, those bits of said string of bits immediately preceding said currently selected portion, and whether said currently selected portion contains said exclusion pattern.

37. The apparatus of claim 36, wherein said exclusion pattern is such that at least a first bit pattern which would indicate an occurrence of said search pattern in said string of bits if contained in said currently selected portion cannot be contained in said currently selected portion if said exclusion pattern is contained in said currently selected portion.

38. The apparatus of claim 30, wherein said plurality of instructions further embody logic for:

E) altering said string of bits in a pre-defined manner if it was determined said string of bits contains said search pattern.

39. The apparatus of claim 38, wherein said altering said string of bits in a pre-defined manner in step E further comprises the steps of:

E1) determining if each occurence of said search pattern determined to be contained in said string of bits in step C is part of an occurence of said frame delimiter, and E2) removing a bit from said string of bits after each occurence of said search pattern determined to be contained in said string of bits in step C which was determined not to be an occurence of said frame delimiter.

40. The apparatus of claim 38, wherein said plurality of instructions further embody logic for said altering said string of bits in a pre-defined manner by inserting a bit into said string of bits after said search pattern if said string of bits is to be transmitted.

41. The apparatus of claim 40, wherein said plurality of instructions further embody logic for:

A1) selecting a location in said string of bits as a currently selected location; and A2) selecting said first number of consecutive bits from said string of bits starting at said currently selected location as said currently selected portion;

and wherein said plurality of instructions further embody logic for:

F) repeating steps A through E on an unprocessed remainder of said string of bits, wherein at least said first number of consecutive bits starting at said currently selected location is now a processed portion of said string of bits.

42. The apparatus of claim 41 wherein said plurality of instructions further embody logic for:

transmitting in a frame said processed portions of said string of bits.

43. A computer system for recognizing a search pattern in an input string of bits, said computer system comprising:

a first processor;

a bus coupled to said first processor;

a modem coupled to said bus for communication, said modem including:

a second processor for executing instructions during operation, and a storage device coupled to said second processor storing a plurality of instructions, said plurality of instructions embodying logic for:

A) selecting a first number of consecutive bits from said string of bits as a currently selected portion;

B) selecting a first set of occurrence patterns based on said search pattern and those bits of said string of bits immediately preceding said currently selected portion;

C) operating on the bits of said currently selected portion in parallel to determine if said currently selected portion contains any of said first set of occurrence patterns; and D) determining if said string of bits contains said search pattern based on whether said currently selected portion contains any of said first set of occurence patterns.

44. The computer system of claim 43, wherein said plurality of instructions further embody logic for said selecting said first set of occurrence patterns by:

B1) determining how much of said search pattern is contained in those bits of said string of bits immediately preceding said currently selected portion; and B2) selecting said first set of occurrence patterns such that if any of said first set of occurrence patterns are contained in said currently selected portion, said string of bits contains said search pattern.

45. The computer system of claim 43, wherein said plurality of instructions further embody logic for said operating on the bits of said currently selected portion in parallel to determine if said currently selected portion contains any of said first set of occurence patterns by:

comparing at least a first occurence pattern of said first set of occurence patterns to said currently selected portion.

46. The computer system of claim 43, wherein said plurality of instructions further embody logic for said operating on the bits of said currently selected portion in parallel to determine if said currently selected portion contains any of said first set of occurrence patterns by:

comparing at least a first masked occurrence pattern of a first set of masked occurrence patterns to said currently selected portion, wherein each masked occurrence pattern in said first set of masked occurrence patterns represents a plurality of occurrence patterns in said first set of occurrence patterns.

47. The computer system of claim 43, wherein said plurality of instructions further embody logic for said selecting said first set of occurrence patterns by:

B1) determining if said currently selected portion contains an exclusion pattern; and B2) selecting said first set of occurrence patterns based on said search pattern, those bits of said string of bits immediately preceding said currently selected portion, and whether said currently selected portion contains said exclusion pattern.

48. The computer system of claim 43, wherein said exclusion pattern is such that at least a first occurrence pattern which would indicate an occurrence of said search pattern in said string of bits if contained in said currently selected portion cannot be contained in said currently selected portion if said exclusion pattern is contained in said currently selected portion.

49. The computer system of claim 43, wherein said plurality of instructions further embody logic for:

E) altering said string of bits in a pre-defined manner if it was determined said string of bits contains said search pattern.

* * * * *

UNITED STATES PATENT AND TRADEMARK OFFICE
CERTIFICATE OF CORRECTION

PATENT NO.   :   5,570,306
DATED        :   October 29, 1996
INVENTOR(S)  :   Paul J. Soo It is certified that error appears in the above-identified patent and that said Letters Patent is hereby corrected as shown below:

In column 3 at line 25 delete "swing" and insert --string--

In column 12 at line 21 delete "dam." and insert --data--

In column 28 at line 22 delete "modern" and insert --modem--

Signed and Sealed this

Sixth Day of May, 1997

Attest:

BRUCE LEHMAN

*Attesting Officer*    Commissioner of Patents and Trademarks